United States Patent
Schwarz et al.

(10) Patent No.: US 10,445,935 B2
(45) Date of Patent: Oct. 15, 2019

(54) USING TRACKING TO SIMULATE DIRECT TABLET INTERACTION IN MIXED REALITY

(71) Applicant: MICROSOFT TECHNOLOGY LICENSING, LLC, Redmond, WA (US)

(72) Inventors: Julia Schwarz, Redmond, WA (US); David J. Calabrese, Bellevue, WA (US); Yasaman Sheri, San Francisco, CA (US); Daniel B. Witriol, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/607,276

(22) Filed: May 26, 2017

(65) Prior Publication Data
US 2018/0342103 A1 Nov. 29, 2018

(51) Int. Cl.
*G06T 19/00* (2011.01)
*G06F 3/01* (2006.01)

(52) U.S. Cl.
CPC .............. *G06T 19/006* (2013.01); *G06F 3/01* (2013.01); *G03H 2210/20* (2013.01)

(58) Field of Classification Search
CPC ...... G02B 2027/014; G02B 2027/0138; G02B 2027/0178; G06F 3/0425; G06F 3/016; G06F 3/04883; G06F 3/017; G06F 3/0482; G06F 3/0488; G06F 2203/04101; H04N 9/31
See application file for complete search history.

(56) References Cited

U.S. PATENT DOCUMENTS 8,928,590 B1 * 1/2015 El Dokor .............. G06F 3/0233
341/22
2008/0266323 A1 10/2008 Biocca et al.
(Continued)

FOREIGN PATENT DOCUMENTS

WO 2016071690 A1 5/2016

OTHER PUBLICATIONS

Tosas, et al., "Virtual Touch Screen for Mixed Reality", In International Workshop on Computer Vision in Human-Computer Interaction, May 16, 2004, 12 pages.
(Continued)

*Primary Examiner* — Saptarshi Mazumder
(74) *Attorney, Agent, or Firm* — Workman Nydegger

(57) ABSTRACT

Optimizations are provided for facilitating interactions with virtual objects included within an augmented-reality scene. Initially, an augmented-reality scene is rendered for a user. Within that scene, an interactive virtual object of an application is rendered. Then, the position of the user's actual hand is determined relative to the interactive virtual object. When the user's actual hand is within a target threshold distance to the interactive virtual object, then a target visual cue is projected onto the interactive virtual object. When the user's actual hand is within an input threshold distance to the interactive virtual object, then an input visual cue is projected onto the interactive virtual object. Once the user's hand is within the input threshold distance to the interactive virtual object, then input may be provided to the application via the interactive object.

20 Claims, 15 Drawing Sheets

(56) References Cited

U.S. PATENT DOCUMENTS

| | | | |
|---|---|---|---|
| 2010/0208033 A1 | 8/2010 | Edge et al. | |
| 2013/0050432 A1 | 2/2013 | Perez et al. | |
| 2014/0022629 A1* | 1/2014 | Powell | G06K 19/0614 359/350 |
| 2014/0168261 A1 | 6/2014 | Margolis et al. | |
| 2014/0245200 A1* | 8/2014 | Holz | G06F 3/017 715/764 |
| 2014/0253687 A1* | 9/2014 | Lee | G06F 3/0488 348/46 |
| 2014/0306891 A1* | 10/2014 | Latta | G06F 3/017 345/158 |
| 2015/0193124 A1* | 7/2015 | Schwesinger | G06F 3/017 715/863 |
| 2015/0338998 A1* | 11/2015 | Chathoth | G06F 3/0425 345/175 |
| 2015/0379770 A1 | 12/2015 | Haley, Jr. et al. | |
| 2016/0210781 A1 | 7/2016 | Thomas et al. | |

OTHER PUBLICATIONS

Velvart, Andras, "HoloLens Mixed Reality Streaming", https://vbandi.net/, Published on: Mar. 4, 2016, 37 pages.

Song, et al., "Vision-based 3D Finger Interactions for Mixed Reality Games with Physics Simulation", In International Journal of Virtual Reality, vol. 8, Issue 2, Jun. 2009, pp. 1-6.

Ha, et al., "WeARHand: Head-Worn, RGB-D Camera-Based, Bare-Hand User Interface with Visually Enhanced Depth Perception", In Proceedings of IEEE International Symposium on Mixed and Augmented Reality, Sep. 10, 2014, pp. 219-228.

Kim, et al., "Touch and hand gesture-based interactions for directly manipulating 3D virtual objects in mobile augmented reality", In Journal of Multimedia Tools and Applications, vol. 75, Issue 23, Feb. 22, 2016, 5 pages.

* cited by examiner

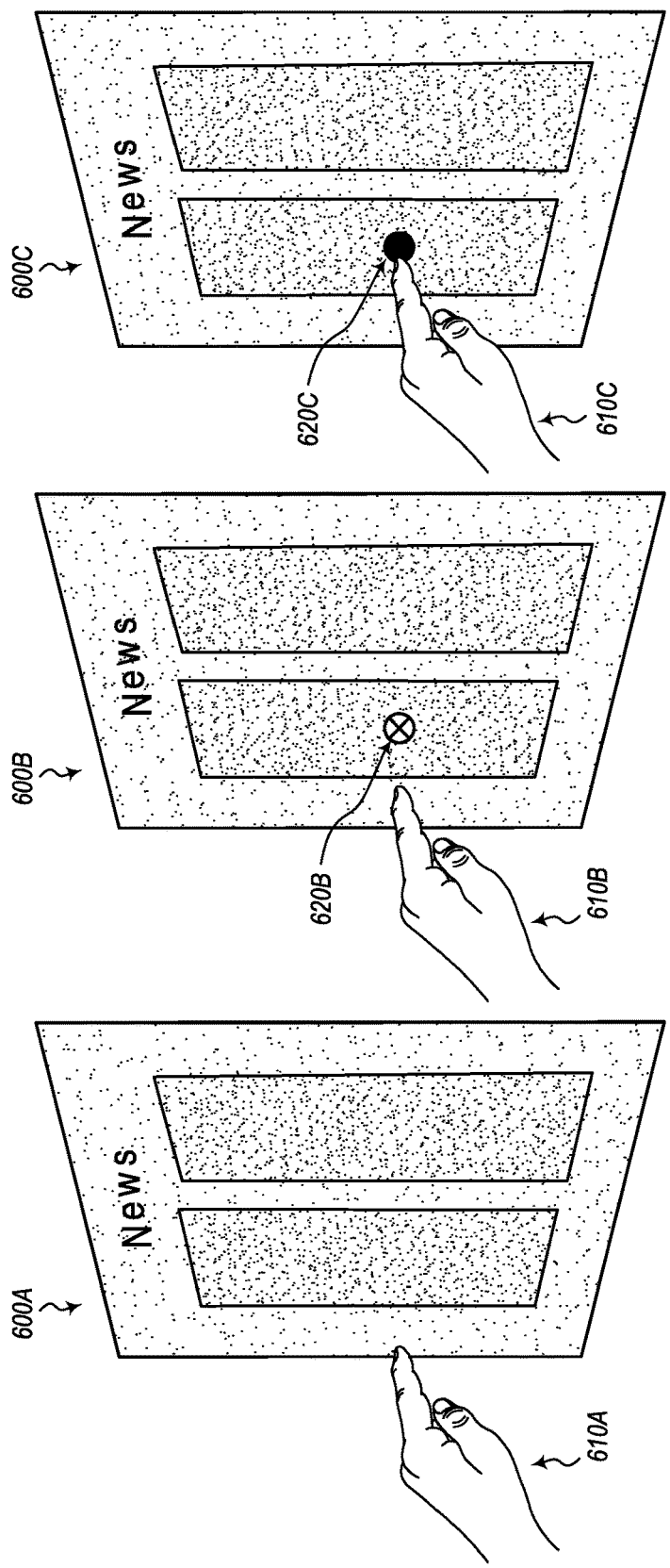

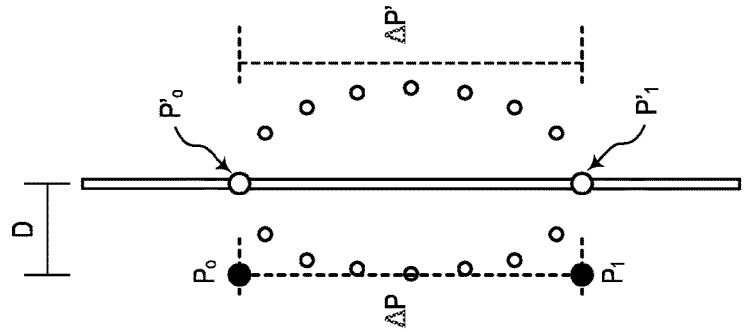
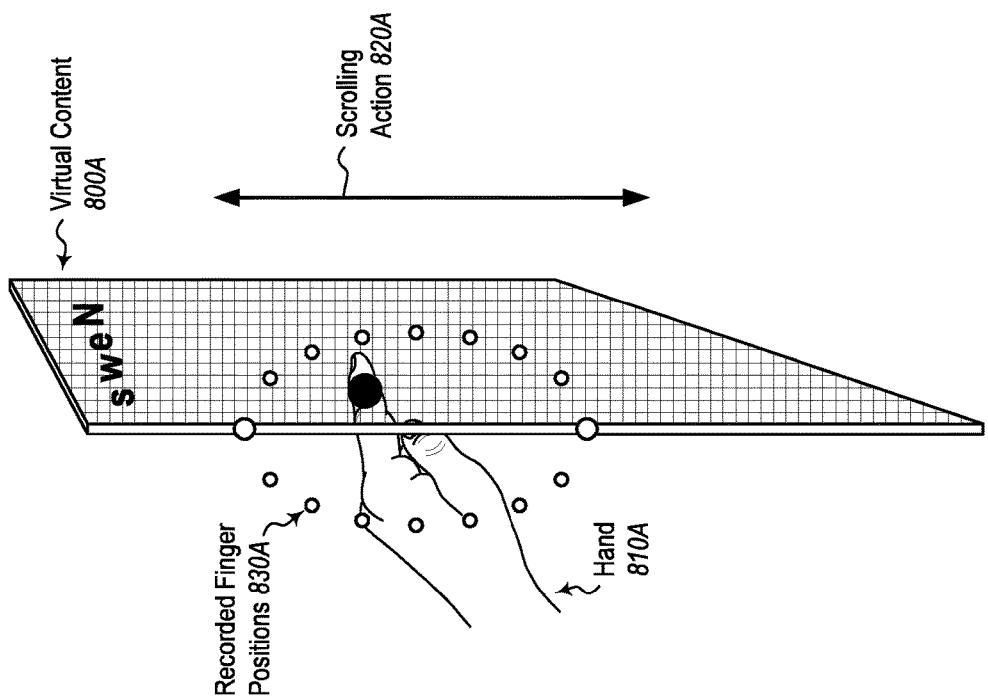
*Figure 8B*
*Figure 8A*

USING TRACKING TO SIMULATE DIRECT TABLET INTERACTION IN MIXED REALITY

BACKGROUND

Mixed-reality computer systems, which include augmented-reality systems and virtual-reality systems, have recently received significant interest because of their ability to create immersive experiences and environments for users. Indeed, conventional augmented-reality systems create an augmented-reality environment where virtual objects are visually projected into the real world. As a result, a user is able to simultaneously view both virtual and actual objects. In contrast, conventional virtual-reality systems completely obstruct the actual world and display only a virtual environment. Unless specifically stated, the descriptions and disclosure provided herein apply to augmented-reality systems.

Augmented-reality computer systems use one or more on-body devices (e.g., a head-mounted device, a handheld device, etc.). The head-mounted device provides a display, sometimes referred to as a head-mounted display (hereinafter "HMD"), that enables a user to view overlapping and/or integrated visual information in the user's augmented environment. By way of example, an augmented-reality system may create an augmented environment by generating visual information in the form of a simulated lamp resting on top of an actual table surface.

Continued advances in hardware capabilities and rendering technologies have greatly increased the realism of virtual objects displayed within an augmented-reality environment. For example, in augmented-reality environments, virtual objects can be placed within the real world in such a way as to give the impression that the virtual object is actually a part of the real world. As the user moves around within the real world, the augmented-reality environment automatically updates so that the user is provided with the proper perspective and view of the virtual objects. This augmented-reality environment is often referred to as a computer-generated scene, or simply a "scene." As used herein, "augmented-reality environment," "environment," "computer-generated scene," and simply "scene" are interchangeable terms that relate to an experience in which virtual content is projected into the real world.

Augmented-reality systems enable a user to move in real-time in relation to the scene. For example, if the user tilts her head in one direction, she would not expect the virtual image or hologram to tilt with her in the scene. Instead, she would expect the virtual image or hologram to remain in alignment with the other real-world objects. Also, if the user were to extend her hand toward a virtual object in a manner that indicates a desire to interact with the virtual object, she would expect the scene to appropriately process her movement in an anticipated manner (e.g., receive input at the location where she extended her hand).

As alluded to above, immersing a user into an augmented-reality environment creates many challenges and difficulties that extend beyond the mere presentation of a scene to a user. For instance, conventional augmented-reality systems are deficient in how they receive user input directed at a virtual object, such as a virtual tablet or touch screen. Among other things, conventional systems lack functionality for guiding and assisting the user when she is targeting a location to actually enter input on a virtual display or touch surface. Accordingly, there exists a strong need in the field to improve a user's interactive experience with virtual objects in an augmented-reality scene.

The subject matter claimed herein is not limited to embodiments that solve any disadvantages or that operate only in environments such as those described above. Rather, this background is provided to illustrate only one exemplary technology area where some embodiments described herein may be practiced.

BRIEF SUMMARY

Disclosed embodiments are directed to systems, hardware storage devices, and methods for facilitating the manner in which a user interacts with virtual content included within an augmented-reality scene, such as a virtual display of an application rendered for a virtual display of a virtual tablet or other virtual device.

In some embodiments, an augmented-reality scene in rendered for a user. This scene includes an interactive virtual object (e.g., an application user interface or display object that is selectable, swipeable, scrollable, zoomable, or otherwise interactive in some manner). This interactive virtual object is part of an application and is rendered with other application content (e.g., the interactive virtual object may be a selectable link included in a virtual news feed of the application). The embodiments also detect a position of a part of the user's actual hand (e.g., a finger or other portion of the user's hand). Here, this determined position is relative to a portion of the interactive virtual object (e.g., the finger's position is determined relative to the selectable link). In response to determining that the part of the user's actual hand is within a target threshold distance to the portion of the interactive virtual object, the embodiments display a target visual cue on the portion of the interactive virtual object. Subsequently, and in response to determining that the part of the user's actual hand is within an input threshold distance to the portion of the interactive virtual object, the embodiments display an input visual cue on the portion of the interactive virtual object. The input visual cue indicates that input is now receivable/enterable for the interactive virtual object. Notably, this input is received at a same location as where the input visual cue is being displayed (e.g., if the cue is projected on the selectable link, then the input will be received at the link). Then, based on a subsequent movement of the part of the user's hand while that part of their hand is within the input threshold distance, the embodiments provide input to the application via the interactive virtual object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the embodiments may be realized and obtained by means of the instruments and combinations particularly pointed out in the appended claims. Features of the embodiments will become more fully apparent from the following description and appended claims, or may be learned by the practice of the embodiments as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 6A, 6B, and 6C illustrate various visual cues that are projected onto a virtual object in response to certain user action.

FIGS. 8A and 8B illustrate an example of a scrolling input gesture being performed on a virtual object.

DETAILED DESCRIPTION

Figure 1:
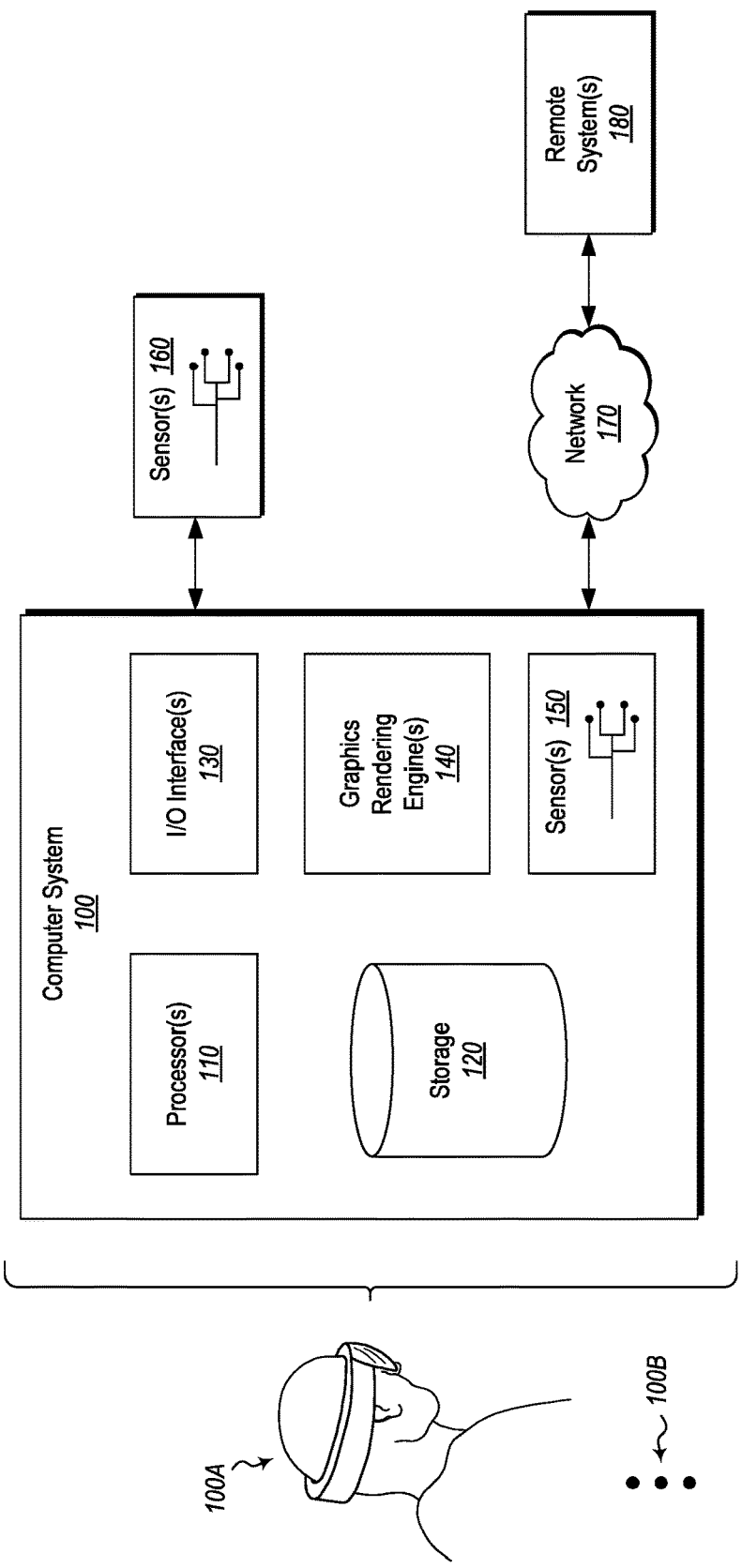
FIG. 1 illustrates an abstract view of a computer system.
Figure 2:
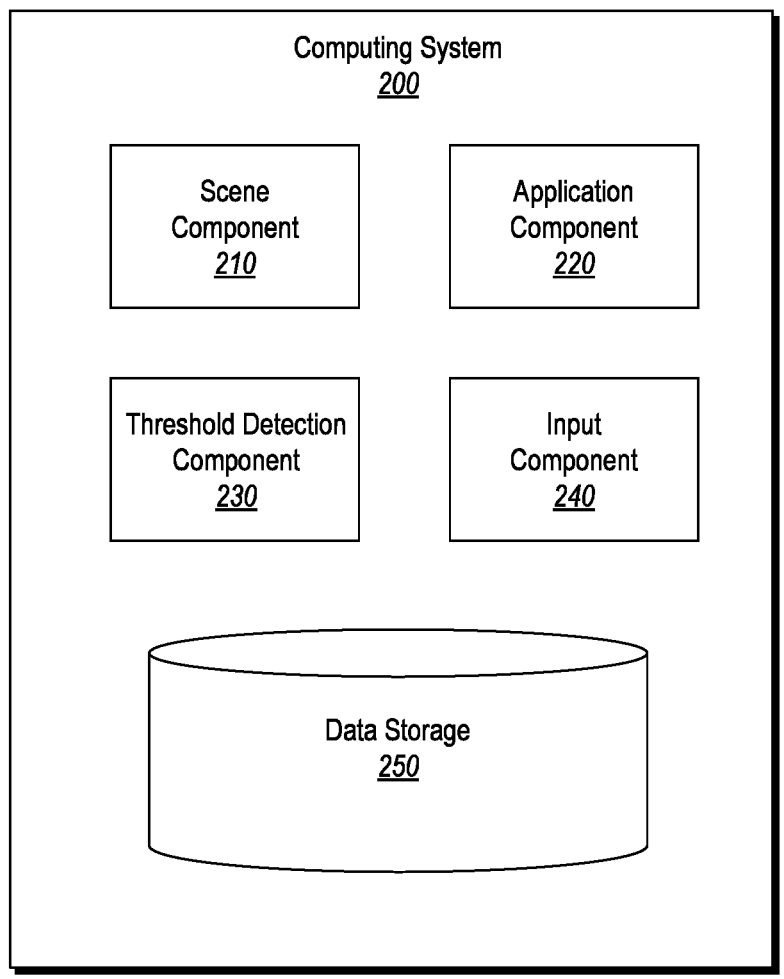
FIG. 2 illustrates an exemplary computer system that can be used to facilitate the manner in which a user interacts with virtual content in an augmented-reality scene.

Disclosed embodiments are directed to systems, hardware storage devices, and methods for facilitating the manner in which a user interacts with virtual content included within an augmented-reality scene.

The embodiments may be implemented to overcome many of the technical difficulties and computational expenses associated with rendering interactive virtual content in an augmented-reality scene. The disclosed embodiments can also improve the overall consumer experience and sense of realism when operating in an augmented-reality environment, by enabling a user to more intuitively and reliably identify and target where their input will be received when interacting with virtual objects. Further, the present embodiments are able to leverage a user's familiarity with actual computing devices (e.g., a tablet, phone, laptop, etc.) to enable that user to more intuitively interact with virtual content. Still further, the present embodiments operate to eliminate user input errors and virtual mistouches with virtual input devices by providing better guidance and direction during the input process.

The disclosed embodiments can also be used to help improve computer efficiencies. For example, because fewer user input errors and virtual mistouches will occur during practice of the disclosed embodiments, the underlying computer system itself will be able to handle a larger number of processing requests (e.g., because time is not being spent on resolving frivolous user input errors). This will also help reduce the exhaustion of wasted battery power on erroneous input processing. As a result, not only will the user enjoy a better experience, but various functionalities of the underlying computer system will also be enhanced.

The disclosed embodiments, which facilitate the manner in which a user interacts with virtual content in an augmented-reality scene, include a wearable display of a computer system. Using this wearable display, the embodiments render an augmented-reality scene for the user. Then, the embodiments render an interactive virtual object (e.g., an object that is selectable, swipeable, scrollable, zoomable, or otherwise interactive in a different manner) within that scene. This interactive virtual object is part of an application and is being rendered with other application content (e.g., the interactive virtual object may be a virtual news feed of the application or any application interface content). The embodiments also detect a position of a part of the user's actual hand (e.g., a position of one or more of the user's fingers). Here, this determined position is relative to a portion of the interactive object (e.g., the "portion" may be a selectable link located within the virtual news feed, and the location of the finger may be determined relative to the selectable link). In response to determining that the part of the user's actual hand is within a target threshold distance to the portion of the interactive virtual object, the embodiments display a target visual cue on the portion of the interactive virtual object (e.g., by displaying a cue on the selectable link in the virtual news feed).

Subsequently, and in response to determining that the part of the user's actual hand is within an input threshold distance to the portion of the interactive object, the embodiments display an input visual cue on the portion of the interactive object. The input visual cue indicates that input is now receivable for the interactive object (e.g., the user may now select the link by performing a tapping gesture on the link). Also, this input is received at a same location as where the input visual cue is being displayed. Then, based on a subsequent movement of the part of the user's hand while that part is continuously within the input threshold distance, the embodiments provide input to the application via the interactive object.

Figure 14:
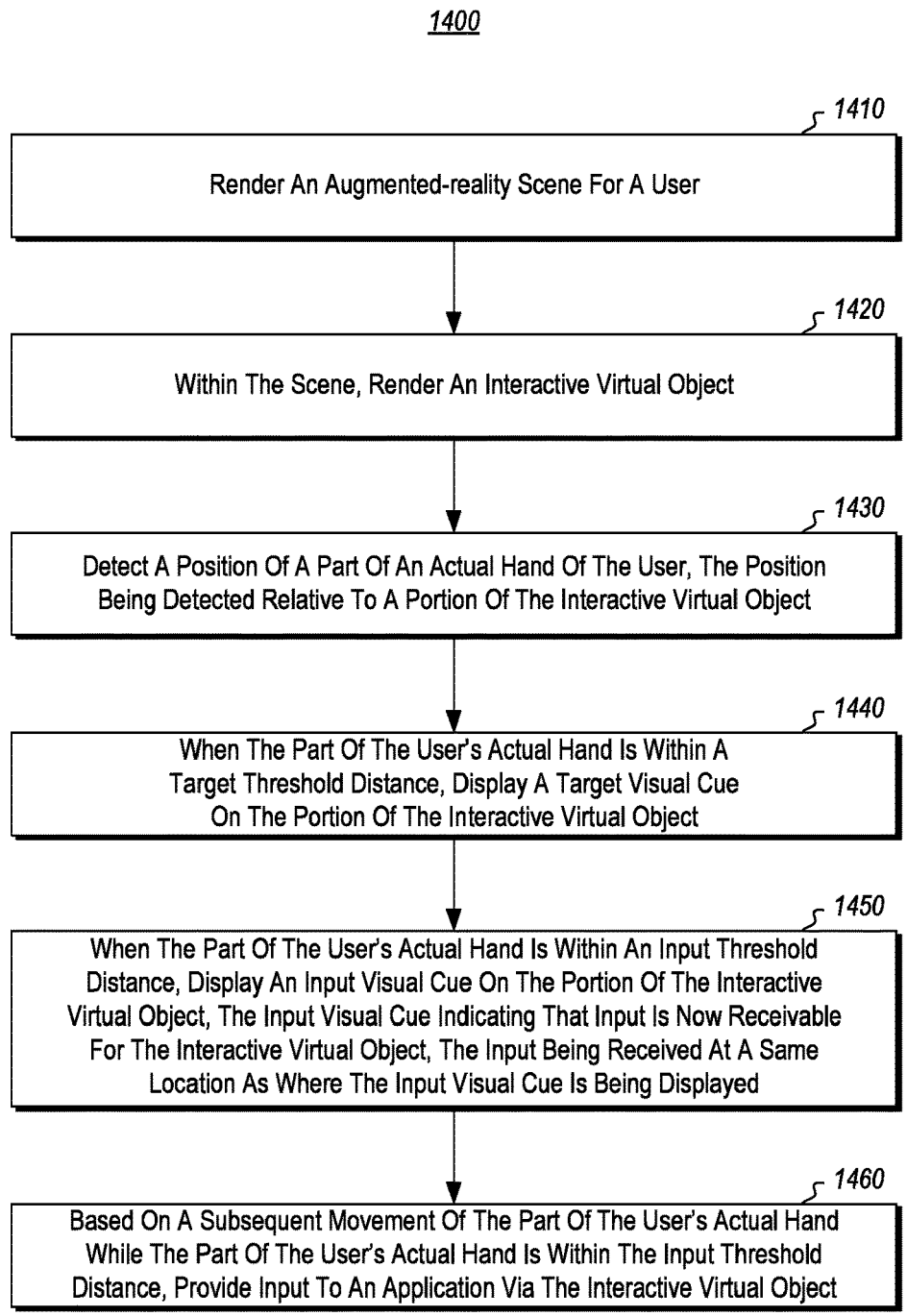
FIG. 14 illustrates an exemplary method for facilitating the manner in which a user interacts with virtual content in an augmented-reality scene.
Figure 15:
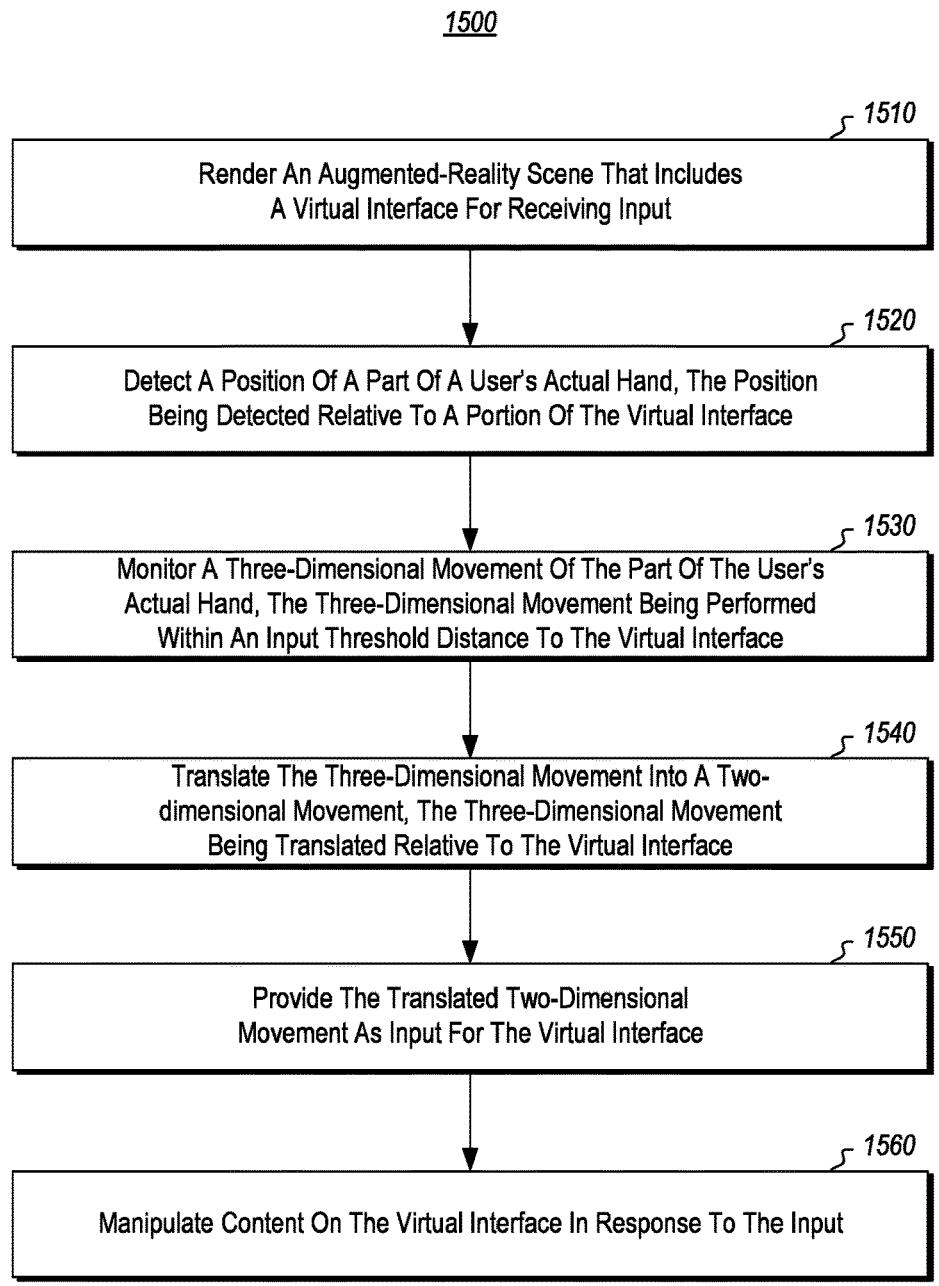
FIG. 15 illustrates an exemplary method for translating three-dimensional input gestures onto a two-dimensional coordinate system.

Having just described various benefits and high-level attributes of the embodiments, the disclosure will now focus on FIG. 1, which presents an introductory discussion of an exemplary computing system. Following that discussion, various architectures and supporting illustrations will be discussed using FIGS. 2-13. Lastly, various flow diagrams and methods will be detailed with respect to the remaining figures (FIGS. 14-15).

Exemplary Computing Systems

As illustrated in FIG. 1, an exemplary computing system 100 may take various different forms. For example, in FIG. 1, the computer system 100 is depicted as a wearable head unit 100A. Although the computer system 100 is depicted as a wearable head unit 100A, the ellipses 100B illustrates that the computer system 100 may be embodied in any form and is not limited strictly to the depiction illustrated in FIG. 1. By way of example, the computer system 100 may take the form of a desktop computer, a laptop, a tablet, a mobile phone, or any other computing device.

In its most basic configuration, the computer system 100 includes at least one hardware processing unit 110 and storage 120. The storage 120 may be physical system memory, which may be volatile, non-volatile, or some combination of the two. The term "memory" may also be used herein to refer to non-volatile mass storage such as physical storage media. If the computing system 100 is distributed, the processing, memory, and/or storage capability may be distributed as well. As used herein, the term "executable module," "executable component," or even "component" can refer to software objects, routines, or methods that may be executed on the computing system 100. The different components, modules, engines, and services described herein may be implemented as objects or processors that execute on the computing system 100 (e.g. as separate threads).

The disclosed embodiments may comprise or utilize a special-purpose or general-purpose computer including computer hardware, such as, for example, one or more processors (such as processor 110) and system memory (such as storage 120), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

As also shown in FIG. 1, the computer system 100 comprises various different components including input/output ("I/O") interface(s) 130, graphics rendering engine(s) 140, and one or more sensors 150. The computer system 100 may also be connected (via a wired or wireless connection) to external sensors 160 (e.g., one or more remote cameras, accelerometers, gyroscopes, acoustic sensors, magnetometers, etc.). Further, the computer system 100 may also be connected through one or more wired or wireless networks 170 to remote systems(s) 180 that are configured to perform any of the processing described with regard to computer system 100.

During use, a user of the computer system 100 is able to perceive information (e.g., an augmented-reality scene) through a display screen that is included within the I/O interface(s) 130, and which is visible to the user. The I/O interface(s) 130 and sensors 150/160 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

In some instances, the positioning and movement of the user and the objects (both virtual and actual) are continuously monitored. This monitoring specifically detects any variation in the position and the movement of the objects, such as a detected change in position, velocity, orientation, or acceleration. These movements can be absolute movements and/or relative movements, such as compared to a relative positioning of the HMD, and such that movements/positioning of the HMD will be calculated into the relative movements/positioning of the objects as they are presented in the scene.

The graphics rendering engine 140 is configured, with the processor(s) 110, to render one or more virtual objects within the scene. In some embodiments, this rendering includes hand occlusions, or other types of occlusions, that are mapped to the relative positions of real-world objects. As a result, the virtual objects accurately move in response to movement of the real-world objects. The graphics rendering engine 140 is also configured to render one or more occlusions that are purely virtual (without being mapped to real-world objects) but which are, nonetheless, positioned and moved responsively to user input as the user interacts within the scene (e.g., an interactive virtual news feed may be projected for the user to interact with, and this news feed may be projected without consideration of the locations of any real-world objects).

The graphics rendering engine(s) 140, which may include one or more GPUs, may be configured to render the occlusions with certain display properties. These properties include coloring, transparency or opaqueness, texturing, edge definition (e.g., thickness and/or sharpness vs. blurring and/or feathering), size, and so forth. When certain position (e.g., distance and or movement) thresholds are detected for the occlusion, then one or more combinations of the display properties for the occlusion will be modified (at least while the detected positioning and/or movement meets or exceeds the thresholds).

A "network," like the network 170 shown in FIG. 1, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 100 will include one or more communication channels that are used to communicate with the network 170. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

As discussed above, computer systems are able to provide a broad variety of different functions. One such function includes facilitating the manner in which a user interacts with virtual content included within an augmented-reality scene. Accordingly, attention will now be directed to FIG. 2, which illustrates an exemplary computer system 200 that may be used to provide this functionality. Here, computer system 200 is analogous to the computer system 100 of FIG. 1 in that it includes all of the same capabilities as computer system 100.

As illustrated, computer system 200 includes a scene component 210, an application component 220, a threshold detection component 230, and an input component 240. Computer system 200 also includes data storage 250. These components will be discussed in more detail in relation to the later figures and flow diagrams. Notably, using these various components, the computer system 200 is able to facilitate the manner in which a user interacts with virtual content in an augmented-reality scene.

Interacting with Virtual Content

Figure 3:
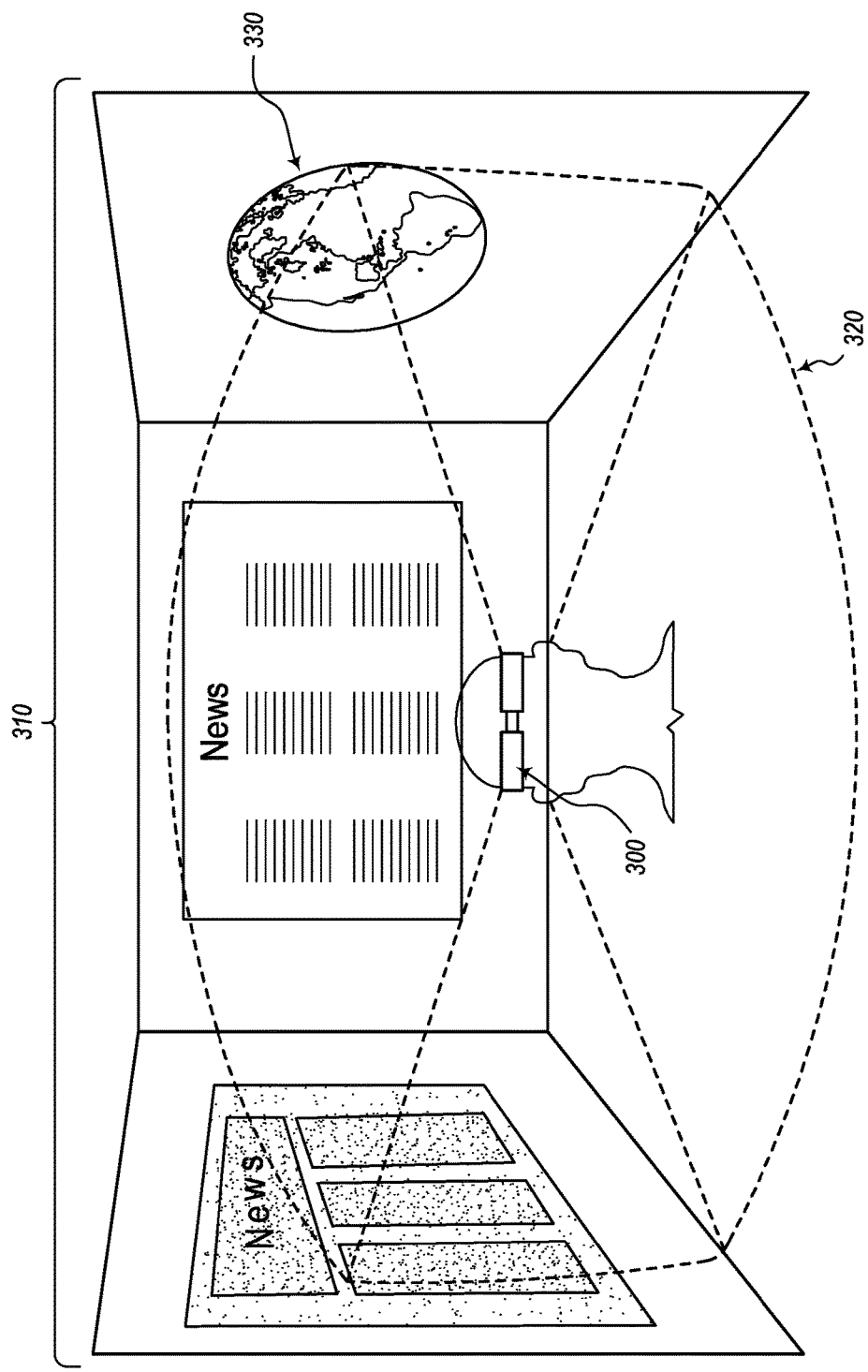
FIG. 3 illustrates an abstract view of an augmented-reality scene.

To demonstrate this functionality, FIG. 3 illustrates a HMD 300 visualizing a scene 310. The HMD 300 may be part of a head-mounted device similar to the computer system 100 of FIG. 1, or, alternatively, the HMD 300 may be communicatively coupled to a different type of computing device (e.g., a laptop, desktop, etc.).

Due to a limited amount of viewing space on the HMD 300, the scene 310 is rendered within a limited field of view 320. To clarify, only a portion of the entire scene 310 is viewable at any given time using the HMD 300. For instance, a part of the globe 330 is within the limited field of view 320. As a result, that part will be viewable by a user. Notably, however, FIG. 3 also shows that a different part of the globe 330 is not within the limited field of view 320. As a result, this different part will not be viewable by the user. In order to view that different part, the user will need to tilt or move her head in a manner so as to bring that different part into the limited field of view 320. This example is provided to illustrate that the scene 310 may include additional content that is not currently viewable in the limited field of view 320.

As also shown in FIG. 3, the embodiments are able to render a broad variety of different types of interactive virtual objects. For example, FIG. 3 shows that the embodiments can render an interactive virtual object as a part of a two-dimensional planar surface (e.g., the news feed) within the augmented-reality scene. To clarify, this news feed is being rendered as a virtual object that is displayed on a planar surface, which may be the display on a virtual tablet, a virtual touch screen, or another virtual display object. Additionally, the embodiments can render an interactive virtual object as part of a simulated three-dimensional object (e.g., the globe) within the augmented-reality scene. As illustrated, a scene may include one or more interactive virtual objects. Further, a scene may include combinations of two-dimensional and simulated three-dimensional interactive virtual objects.

Figure 4:
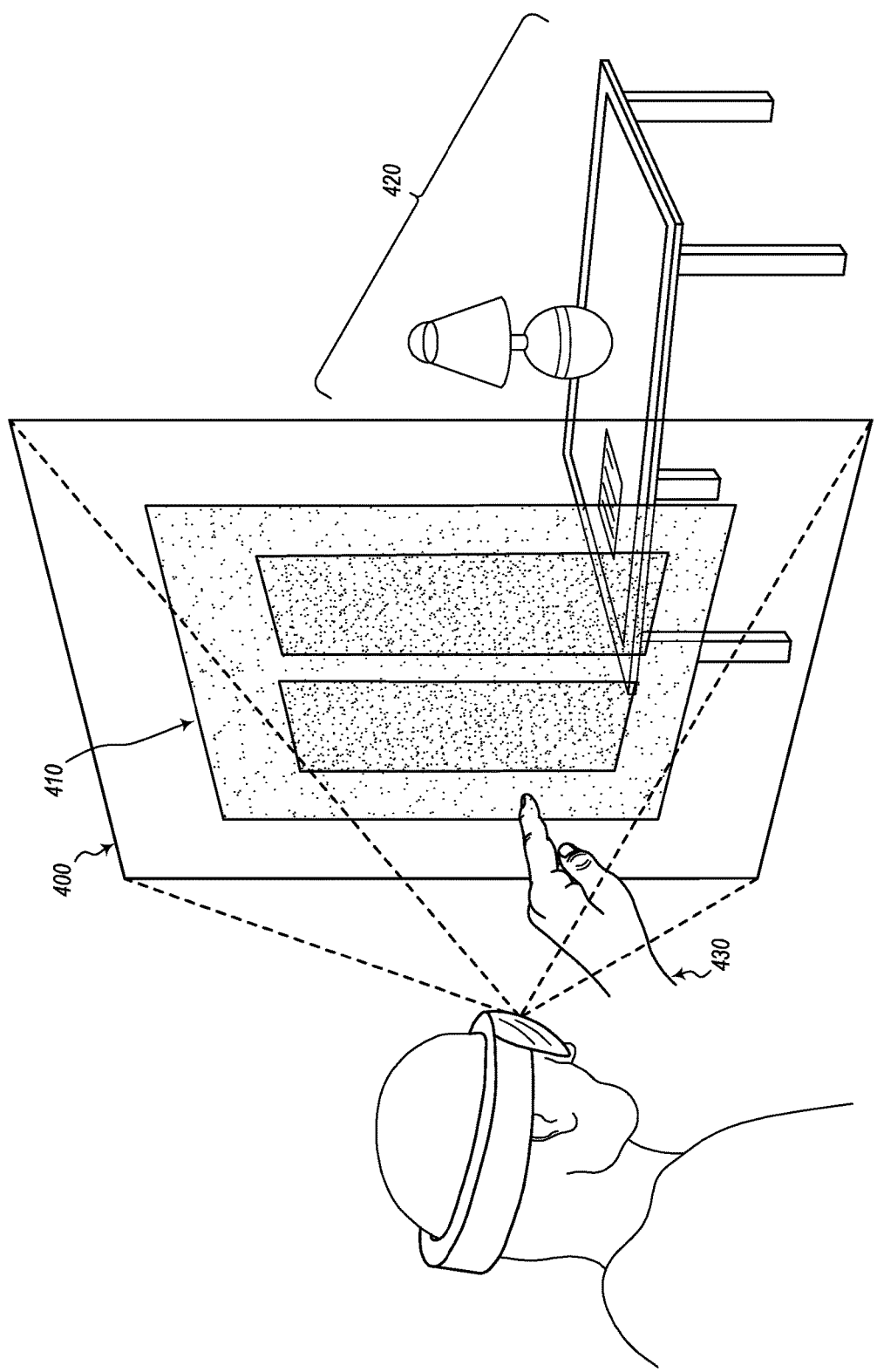
FIG. 4 illustrates an example of a user interacting with a virtual object while immersed in an augmented-reality scene in which real-world objects are also present.

Attention will now be directed to FIG. 4, which presents another scenario in which a portion of an augmented-reality scene 400 is illustrated. Here, this scene 400 includes virtual content 410 (e.g., the news feed) that is being rendered in an environment in which actual content 420 is also present. In this scenario, the actual content 420 includes a lamp and a table. It will be appreciated, however, that any type of actual content may be present in an augmented-reality scene. As a result, the embodiments should not be limited only to the scenario illustrated in FIG. 4.

FIG. 4 also demonstrates that the virtual content 410 may be at least partially transparent such that the actual content 420 is at least marginally viewable behind the virtual content 410. Here, it is worthwhile to note that the embodiments may employ various levels of transparency with regard to the projected virtual content. Accordingly, some virtual objects may be rendered in a more transparent manner than other virtual objects. It will also be appreciated that the embodiments enable a user to tilt, turn, or otherwise move a planar virtual object (e.g., the two-dimensional news feed) so that it can appear to become three-dimensional. By way of example, the user can tilt the virtual content 410 in such a manner so that it appears to be a three-dimensional object.

FIG. 4 also shows that a user's actual (not virtual) hand 430 is approaching the virtual content 410. Here, it is worthwhile to note that the virtual content 410 is "interactive." By interactive, it is meant that a user can use her actual hand (or other body part) to manipulate or otherwise perform operations on the virtual content 410. A non-exhaustive list of input gestures includes swiping, zooming, tapping, and touching. These gestures may be single touch gestures or multi-touch gestures. It will also be appreciated that a user may use any actual body part to interact with the virtual content. For simplicity purposes, however, the remaining discussion will focus on the use of a user's hand in providing input gestures.

Figure 5:
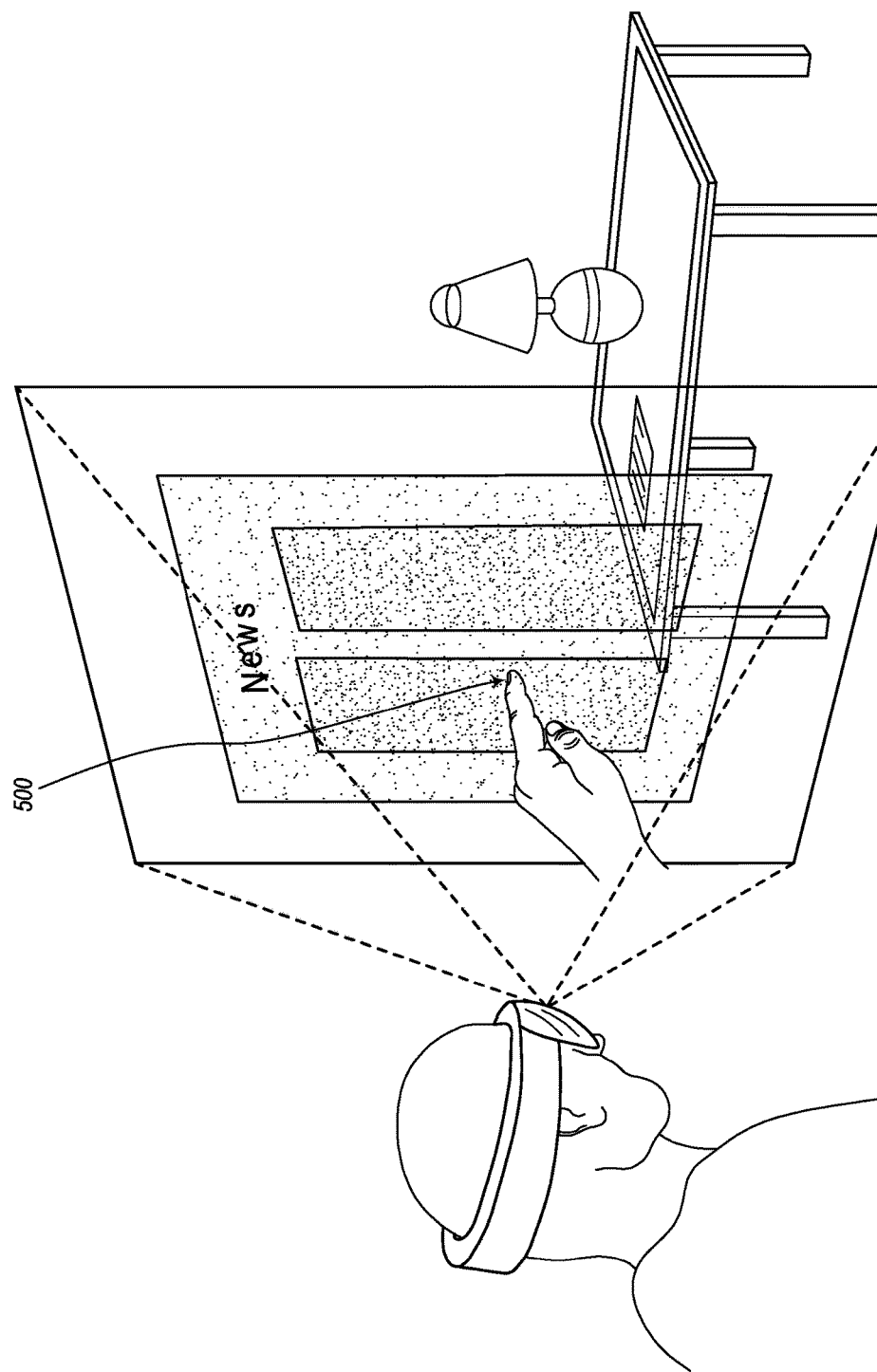
FIG. 5 illustrates another example of a user interacting with a virtual object.

One example of these input gestures is found in FIG. 5. In particular, FIG. 5 presents a scenario similar to the scenario presented in FIG. 4 with the exception that the user's hand is now interacting with the virtual content. As shown in FIG. 5, the user's actual finger has passed at least partially through the virtual content (illustrated a point 500). Said differently, the user's finger has passed through the virtual display surface that is rendering the 'news' or other displayed content. Accordingly, FIG. 5 shows that when a user interacts with virtual content, sometimes the user's extremities (e.g., the user's hands, fingers, etc.) will actually pass through that virtual content.

As discussed earlier, the convention technology fails to provide functionality for enhancing a user's interactive experience with virtual content when that user is immersed in an augmented-reality scene. In particular, the conventional technology fails to provide a user with an intuitive indication of where the user's input will be received when such interaction occurs. In contrast to the conventional technology, the present embodiments satisfy this need as well as many other needs.

Accordingly, attention will now be directed to FIGS. 6A-6C. These Figures illustrate various features of the present embodiments, which features enable a user to intuitively and reliably target a location where input will be received while the user is immersed in an augmented-reality scene.

Initially, FIG. 6A shows virtual content 600A that is being rendered in an augmented-reality scene (not labeled in the Figure). As shown in FIG. 6A, a user's hand 610A is approaching the virtual content 600A. The present embodiments employ position tracking technology to determine a positional relationship between the user's hand 610A and the virtual content 600A. Stated differently, the present embodiments are able to measure and track the distance between the user's hand 610A and the virtual content 600A. Additionally, it will be appreciated that the present embodiments are not only able to discern distances between the user's hand 610A and the virtual content 600A as a whole, but rather the present embodiments are also able to determine distances between each part of the user's hand 610A and each sub-portion of the virtual content 600A. As a result, the present embodiments are able to determine where each part of the user's hand 610A is located in relation to any point within the virtual content 600A.

To enhance the user's experience while she is immersed within the augmented-reality scene, the present embodiments project visual cues to assist the user in navigating and interacting with the scene's virtual content. To clarify, as the user's finger (or other extremity) approaches an interactive virtual object, particularly a display surface that is rendering application content, the present embodiments notify the user on when touch input will become receivable/enterable for the virtual object. This functionality is visually illustrated in FIGS. 6B and 6C. While these figures focus on the use of a visual cue, it will be appreciated that the cue can be visual, audio, haptic, or any combination of the foregoing.

Similar to FIG. 6A, FIG. 6B shows virtual content 600B and the user's hand 610B. While the user's hand 610A in FIG. 6A was too far removed from the virtual content 600A, FIG. 6B shows that the user's hand 610B is now closer to the virtual content 600B. As indicated earlier, the embodiments are able to track and monitor the positional relationship between all areas of the user's hand 610B (e.g., her finger) and all areas of the virtual content 600B. When the closest portion of the user's hand 610B (e.g., the fingertip of her extended finger) is within a target threshold distance to at least one portion of the virtual content 600B, then the embodiments will project a target visual cue 620B on that portion of the virtual content 600B.

As illustrated in FIG. 6B, the target visual cue 620B is illustrated as being underneath the user's hand 610B. Further, this target visual cue 620B is projected at a location on the virtual content 600B where the user's hand 610B is anticipated to be heading towards. If the user were to move her hand to a different location while still maintaining her hand within a target threshold distance to any other portion of the virtual content 600B, then the target visual cue 620B will follow the user's hand movement and will relocate to a corresponding different portion of the virtual content 600B.

Here, it is worthwhile to note that while the user's hand 610B is within the target threshold distance such that the target visual cue 620B is displayed, no input will be received at the virtual content 600B. Instead, the target visual cue 620B is being provided simply to assist the user in targeting where her input may eventually be entered. In order to actually enter input, the user will need to move her hand even closer to the virtual content 600B such that a second threshold distance, or rather an input threshold distance, is satisfied. This scenario is presented in FIG. 6C.

In particular, FIG. 6C again illustrates virtual content 600C and the user's hand 610C. While the user's hand 610B in FIG. 6B was merely within a target threshold distance to the virtual content 600B, the user's hand 610C in FIG. 6C is now sufficiently close to the virtual content 600C so as to be within an input threshold distance. Being within the input threshold distance causes an input visual cue 620C to be projected onto the virtual content 600C. To clarify, while the user's hand 610C is within the input threshold distance to the virtual content 600C, then an input visual cue 620C will be projected onto the virtual content 600C, and the user may now enter input at the location where the input visual cue 620C is being projected. As discussed earlier, this input may include touching, tapping, swiping, zooming, or any other interactive gesture, and may be a single or multi-touch input, as will be discussed in more detail later. Sometimes, the visual cue 620C reflects and corresponds to user input being successfully received and entered by the system.

Here, it is worthwhile to note that the input visual cue 620C has a different visual appearance than the target visual cue 620B. This difference in visual appearance is beneficial because it enables the user to clearly understand when the user's hand is sufficiently close to the virtual content to enter input and/or when input has actually been received.

In some embodiments, once the user's hand satisfies the input threshold distance (as opposed to being within only the target threshold distance), then the input visual cue will immediately displace the target visual cue. As a result, in these embodiments, the target visual cue disappears and the input visual cue takes its place. These embodiments operate under a dichotomic, or rather binary, manner in that only one visual cue is viewable at a time.

In contrast, other embodiments provide for a progressive transition from the target visual cue to the input visual cue, with varying degrees of visual indication. For instance, as soon as the user's hand is within the target threshold distance, then the target visual cue is projected at an anticipated ending location on the virtual content. Notably, however, as the user's hand progressively moves closer to the virtual content, then these embodiments will progressively alter the visual appearance of the target visual cue until such time as the user's hand reaches the input threshold distance. Once at the input threshold distance, then the input visual cue is projected in its entirety. To clarify, as the user's hand progressively moves from the furthest reaches of the target threshold distance to the input threshold distance, then the target visual cue will progressively change, or transform, in appearance until the input visual cue is rendered.

This change in appearance may occur in a number of ways. For example, in some embodiments, the change may include a change in color such that the target visual cue progressively changes in color until the input visual cue, which is of a different color than the target visual cue, is displayed. In other embodiments, the change may include a change in visible size. For example, the target visual cue may be much larger than the input visual cue. Therefore, as the user's hand approaches the input threshold distance, the visual cue progressively changes from a large visual cue to a smaller visual cue. Even further, some embodiments may alter the visual format of the visual cues. For example, the target visual cue may be illustrated as including a circle with a crossing or "X" inside the circle (e.g., a gun target). As the user's hand approaches the input threshold distance, the target may be filled in until only a darkened circle is visible. Degrees of transparency/opacity can also be used (e.g., less transparency the closer the finger gets to the display surface). Combinations of the foregoing can also be used. Accordingly, the disclosed embodiments include any kind of change in visible appearance to the target visual cue based on proximity of the user's finger or other portion(s) of the user's hands to the virtual interactive elements on the virtual display surface(s) within the augmented environment.

As described, the target visual cue will suddenly or progressively change in appearance to coincide with the target visual cue transforming into the input visual cue as the user's hand progressively moves towards the input threshold distance. Here, it is worthwhile to note that the user will not be able to enter input at the virtual content until such time as the input visual cue is completely projected, or rather, until such time as the input threshold distance is satisfied. Therefore, the target visual cue is provided to guide the user in targeting where her input will eventually be received/entered on the virtual content 600C.

While the above discussion focused on the use of a visual cue (and as briefly discussed earlier), it will be appreciated that the embodiments are also able to provide other types of cue notifications. For example, when the user's hand initially satisfies the target threshold distance, a first audio cue may be played loud enough so the user can hear the cue. Likewise, when the user's hand initially satisfies the input threshold distance, then a second audio cue may be played. These audio cues may be played in combination with the visual cues discussed above. Additionally, when the user actually enters her input, an audio cue may be played. This audio cue may also include a beat that plays faster or louder as the threshold distances are satisfied.

Even further, some embodiments may provide a haptic, or vibrational, cue to the user. For example, if the user is using a handheld device while immersed within the augmented-reality scene, then some embodiments will cause the handheld device to vibrate at a first level when the user's hand initially satisfies the target threshold distance and at a second level when the user's hand (or rather the closest portion of the user's hand) initially satisfies the input threshold distance. Accordingly, it will be appreciated that the embodiments may utilize a wide variety of notification techniques to notify the user when the closest portion of the user's hand has initially satisfied the various threshold distances.

To provide additional clarification regarding the embodiments, FIGS. 7A-7D further elaborate on the threshold distances.

Figure 7D:
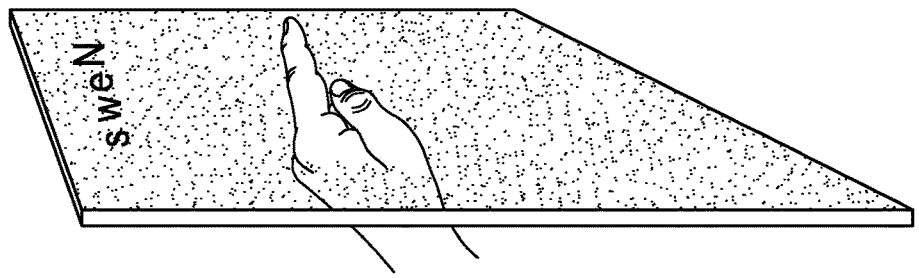
FIGS. 7A, 7B, 7C, and 7D also illustrate various visual cues.
Figure 7C:
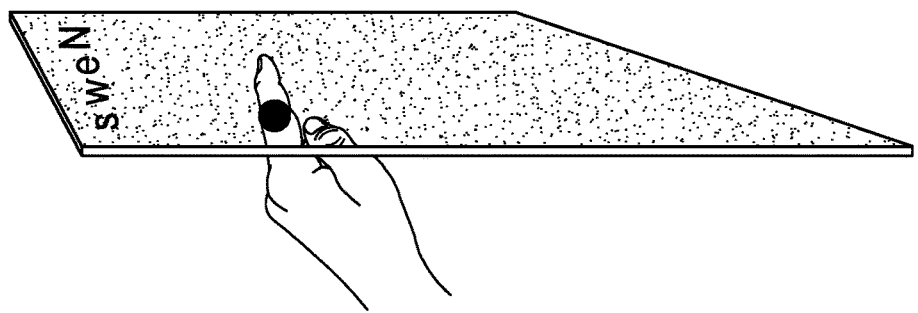
Figure 7B:
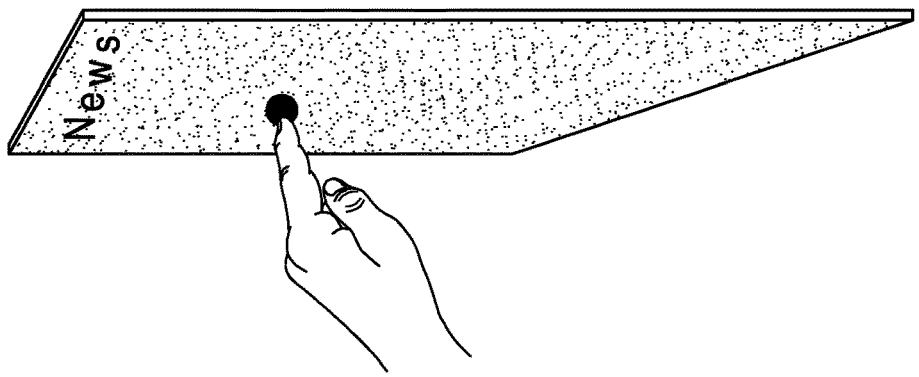
Figure 7A:
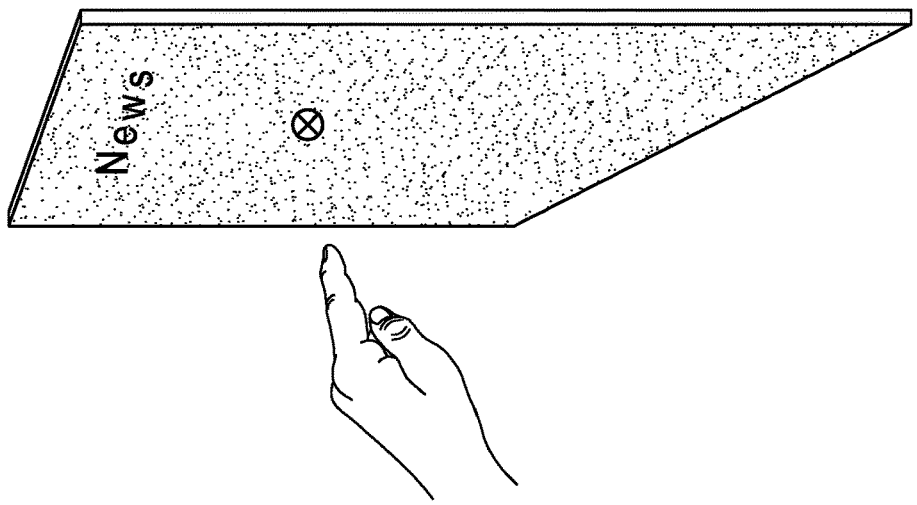

For example, FIG. 7A illustrates a scenario in which the user's finger is sufficiently close to the virtual content so that the target visual cue is projected underneath the user's finger at an anticipated ending location of the user's finger.

As the user progressively moves her extended finger towards to the virtual content, eventually the user's finger will be within the input threshold distance. Such a scenario is illustrated in FIG. 7B. In particular, FIG. 7B shows that the user's finger is now within the input threshold distance to the virtual content. Because the user's finger is within the input threshold distance, the input visual cue is being projected according to the manner described earlier. Further, the input visual cue indicates a location where input is or may be entered by the user. By way of example, if the user placed her finger over a hyperlink in the news feed, then the transitioning of the target visual cue to the input visual cue may be sufficient to trigger a selection of the hyperlink. In other embodiment, the user may provide a taping motion with their finger on the virtual hyperlink, once the input visual cue is reflected hyperlink to trigger a selection of the hyperlink in the virtual application. Alternatively, a tapping motion of the user's finger may cause the user's finger to iteratively enter and exit the threshold distance that is sufficient to render the input visual cue, over the hyperlink, thereby causing a double-tap selection of the hyperlink. In other situations, the user may perform a scrolling action to scroll while the input visual cue is rendered and to thereby cause a scrolling of the displayed content on the virtual display. As discussed previously, other types of input entered on a virtual display object that simulates actual touch input on physical display objects may be entered as well.

It will be appreciated that the embodiments are able to recognize and differentiate between the various types of input gestures. For example, the embodiments are able to anticipate what type of gesture the user will use based on the type of virtual object that the user's finger is approaching. For instance, if the user's finger appears to be approaching a selectable link, then the embodiments may anticipate that the user is going to perform a touch or tapping gesture. In contrast, if the user's finger appears to be moving towards a body of virtual text, then the embodiments may anticipate that the user is going to scroll through the text, select the text, zoom in on the text, or perform some other input gesture related to textual information. As a result, the embodiments are able to anticipate which input gesture the user will provide. This anticipation is at least partially based on the type of virtual object that the user appears to be focusing her attention on. This can help facilitate the recognition of the gesture, once input is received within the threshold distance.

In other instances, the embodiments may anticipate what type of gesture the user will use based on the position or shape of the user's finger or overall hand. For example, if both of the user's hands are approaching the virtual content, then the embodiments may anticipate that the user will perform a zoom gesture. In contrast, if only a single hand is moving towards the virtual object, and that hand is positioned in a selective pose (e.g., one finger extended while the others are curled), then the embodiments may anticipate that the user will perform a tapping gesture. Accordingly, the foregoing examples were provided to demonstrate that the embodiments are able to differentiate between the large variety of different types of input gestures.

Continuing with the disclosure, it will be appreciated that in some situations, the user's finger (or other portion of her hand) may actually pass through the virtual content. Such a scenario is presented in FIG. 7C. As shown in FIG. 7C, part of the user's finger is on the front side of the virtual content while a different part of the user's finger (i.e. the tip of her extended finger) is on a back side of the virtual content. As a result, different portions of the user's hand are located within different threshold distances (e.g., the user's wrist may be in the target threshold distance, some portions of the user's finger may be in the input threshold distance relative to the front side of the virtual content, some portions of the user's finger may be in the input threshold distance relative to the back side of the virtual content, etc.). It will be appreciated that the threshold distances may be determined from either side (i.e. the front side or the back side) of the virtual content.

When portions of the user's hand span multiple threshold distances, the embodiments analyze the positioning and shape of the user's hand to determine which hand portion is most relevant. For example, if the user's hand is positioned in a way so as to indicate that the user desires to select something (e.g., one finger is extended while the other fingers are curled), then these embodiments will focus on the tip of the user's extended finger to determine which threshold distance is satisfied. If the extended finger has passed through the virtual content (and the hand is still positioned in a selective manner), then the embodiments will base the threshold distance determinations on the tip of the user's extended finger because the user's hand is still positioned in a selective manner (which means the fingertip is the relevant hand portion). When making these determinations, the embodiments will determine whether the furthest reaches of the extended finger (i.e. the fingertip) are still within the input threshold distance in relation to the "backside" of the virtual content. Similarly, if the extended finger has not passed through the virtual content, then the embodiments will determine whether the furthest reaches of the extended finger are within the input threshold distance in relation to the "frontside" of the virtual content. Accordingly, when determining which portion of the user's hand is most relevant with regards to determining whether the threshold distances have been satisfied, the embodiments are able to analyze the shape and position of the user's actual hand.

In FIG. 7C, because the furthest reaches of the user's extended finger (e.g., the fingertip of the user's index finger) is still within the input threshold distance in relation to the backside of the virtual content, the user may still enter input at the location where the input visual cue is being projected. Accordingly, even if the user's hand passes through the virtual content, the embodiments are able to analyze the positioning of the hand and properly make determinations regarding whether to calculate the threshold distances in relation to the frontside or backside of the virtual content.

Therefore, according to the scene shown in FIG. 7C, the embodiments will now track and monitor the distance between 1) the user's fingertip and 2) the backside of the virtual content. As long as the user's fingertip stays within the relative input threshold distance in relation to the backside of the virtual content, then the input visual cue will still be rendered and the user can still enter input at that location on the virtual content.

It will be appreciated that the user may continue to move her hand through the virtual content. Such a scenario is presented in FIG. 7D. As illustrated in FIG. 7D, the user has moved her extended finger completely through the virtual content, and the user's fingertip has now surpassed both the input threshold distance and the target threshold distance in relation to the backside of the virtual content. Because both thresholds have been surpassed by the user's fingertip, no visual cue will be projected on the virtual content. To clarify, even though other portions of the user's hand satisfy the various threshold distances, no visual cues will be projected because the embodiments have determined that (due to the shape and positioning of the user's hand) the threshold determinations should be calculated in relation to the user's fingertip. As a result, this scenario is analogous to the scenario present in FIG. 6A in which no cues are visible because the relevant portion of the user's hand (i.e. her fingertip as determined by the shape and position of her hand) is not within any of the threshold distances.

It will be appreciated that as the user's fingertip approaches and passes through the various threshold distances, then each appropriate visual cue will be projected until such time as each threshold is no longer satisfied. To clarify, between the events illustrated in FIGS. 7C and 7D, the input visual cue was rendered while the user's fingertip was within the input threshold distance in relation to the back side of the virtual content, and the target visual cue will be rendered (although not presently illustrated) while the user's fingertip is within the target threshold distance in relation to the back side of the virtual content. Accordingly, FIG. 7D shows a situation in which the user's fingertip has already progressed beyond the input threshold distance and the target threshold distance.

Here, it is worthwhile to note that the target threshold distance and the input threshold distance are adjustable. For example, in some embodiments, a user may configure one or more default settings to establish the target threshold distance and the input threshold distance. Prior to adjustment, the target threshold distance may be about 10 centimeters from the virtual content and the input threshold distance may be about 5 centimeters from the virtual content.

In other embodiments, the threshold distances may be dynamically adjusted based on a size of the virtual content within the augmented-reality scene. By way of example, suppose the augmented-reality scene includes two news feeds (e.g., as shown in FIG. 3). In some scenarios, news feed #1 may be much larger in visual appearance than news feed #2. Because news feed #1 is much larger (in this example), the target threshold distance and the input threshold distance for news feed #1 may be dynamically adjusted to be larger than the default value. To illustrate, instead of 10 centimeters, these embodiments will dynamically adjust the target threshold distance to be larger than 10 centimeters (e.g., perhaps 12 cm, 14 cm, 16 cm, or some other value). In a similar manner, the input threshold distance will be dynamically adjusted to be larger than 5 cm (e.g., perhaps 7 cm, 8 cm, 9 cm, or some other distance). While the threshold distances for news feed #1 were made larger, the threshold distances for news feed #2 may be made smaller in a manner similar to the manner described for news feed #1. Accordingly, for these embodiments, the threshold distances are dynamically adjustable based on a size of the virtual content. Alternatively, instead of making the threshold distances larger for larger virtual content, other embodiments will make the threshold distances smaller for larger virtual content and larger for smaller virtual content. Regardless, the embodiments are able to dynamically adjust the threshold distances based on a size of the corresponding virtual content. In still other embodiments, the threshold distances are dynamically adjustable based on other factors. For example, the distances may be adjusted based on the user's hand pose, hand speed, the presence of a second hand, and even other contextual factors (e.g., whether the user is listening to music, watching television, or even whether the virtual surface is visible in the user's field of view).

In some instances, the threshold distances are measurements corresponding to perpendicular distances extending away from the planar surface point of the virtual display. In other instances, the threshold distances are measured as absolute linear distances in any directional angle from the initial target visual cue. In yet other instances, the threshold distances are measured as absolute distances of the path over which the user's finger has moved away from the initial target visual cue, after the initial target visual cue is triggered, regardless of whether the movement is along a straight, curved, or irregular path.

Attention will now be directed to FIGS. 8A and 8B. In particular, FIGS. 8A and 8B focus on a situation that occurs in a virtual environment but that does not occur in an actual environment. To clarify, suppose a user is holding an actual computing tablet. When using that tablet, the user may place her finger on the tablet's screen and enter input via the touchscreen. Notably, once the user's finger touches down on the touchscreen, the user's finger is impeded from moving further inward. Stated differently, the user's finger cannot push through the tablet's touchscreen. In contrast to a real-world tablet, if a user is interacting with a virtual tablet (or other virtual content in the augmented-reality scene), there is no backstop to prevent the user's finger from passing completely through the virtual object. As a result, there is no blunt stoppage to the user's finger like there is for a real-world tablet. This phenomenon is presented in FIGS. 8A and 8B.

FIG. 8A illustrates virtual content 800A and a user's hand 810A interacting with that virtual content 800A via a scrolling action 820A. Here, some of the recorded positions of the user's hand 810A are shown collectively as recorded finger positions 830A. FIG. 8B shows the same scenario as FIG. 8A but from a different perspective and with additional identifying point data. This additional point data will be discussed shortly.

As illustrated by FIGS. 8A and 8B, virtual content in an augmented-reality scene can be directly interacted with by a user. For example, suppose the virtual content 800A of FIG. 8A is being rendered in the form of a virtual tablet (e.g., the news feed is being rendered in a tablet-like manner). These virtual tablets respond just like actual tablets in that they also allow a user to scroll, swipe, press buttons, zoom, and perform other conventional tablet operations. Also, although the virtual content may be rendered in a manner such that it looks three-dimensional ("3D") (e.g., the globe 330 in FIG. 3), the virtual content is actually only two-dimensional ("2D"). Further, because there is no actual backstop when a virtual tablet is rendered in an augmented-reality scene, a user's scrolling finger may pass through the virtual content 800A. Therefore, to be properly displayed in the augmented-reality scene, it is necessary to translate a user's 3D input gesture onto a 2D coordinate system in relation to the virtual content 800A.

Points $P_o$, $P_1$, $P'_o$, and $P'_1$ in FIG. 8B are provided to illustrate how the embodiments perform this 3D to 2D translation. In particular, point $P_o$ is a composite coordinate value of the highest recorded point and also the left-most recorded point as recorded in the recorded finger positions 830A (and from the perspective illustrated in FIG. 8B). Similarly, point $P_1$ is a composite coordinate value of the lowest recorded point and also the left-most recorded point as recorded in the recorded finger positions 830A. Measurement D is the distance between $P_o$ and the virtual content 800A. Measurement $\Delta P$ is the distance between $P_o$ and $P_1$.

Points $P'_o$ and $P'_1$ represent the "translated" values of the user's 3D scrolling action 820A onto a 2D coordinate system relative to the virtual content 800A. Accordingly, measurement $\Delta P'$ is the distance between the translated 2D points $P'_o$ and $P'_1$.

After determining these translated point values, the embodiments may then apply additional enhancements, or conversions, to the translated 2D points (i.e. points $P'_o$ and $P'_1$). These additional enhancements are beneficial because, as shown by the recorded finger positions 830A, the user's finger actually moves in a circular manner (as opposed to a purely linear manner) when performing a scrolling action. Therefore, these additional conversions are performed to further enhance the 3D to 2D translation. These additional conversions are based on properties of the scrolling finger's position and motion. For example, the velocity and distance of the scrolling finger in relation to the virtual content 800A are considered as part of the additional conversions.

To perform these enhancements and to compensate for this circular phenomenon, the embodiments adjust the amount of the translated 2D movement (i.e. $\Delta P'$ in FIG. 8B) by dividing the change in actual finger movement $\Delta P$ by the distance from the finger to the screen (i.e. distance D). This relationship is shown in the following manner:

$$\Delta P' \approx \frac{\Delta P}{D}$$

Accordingly, the present embodiments translate 3D input gestures onto a 2D coordinate system relative to certain virtual content. To further improve this 3D to 2D translation process, the embodiments (as discussed above) may introduce additional compensations to correct for various non-linear movement (e.g., the circular scrolling action 820A).

While the above disclosure focused on the use of a few enhancement and compensatory examples, it will be appreciated that the present embodiments are not limited solely to these types of enhancements. For example, other embodiments use machine learning to learn complex function-based compensations that are based on factors such as hand pose, hand distance to the virtual object, previous hand motion, and/or other signals. As a result, the present embodiments are able to use a broad variety of compensatory techniques for converting a 3D movement onto a 2D coordinate plane.

Figure 9B:
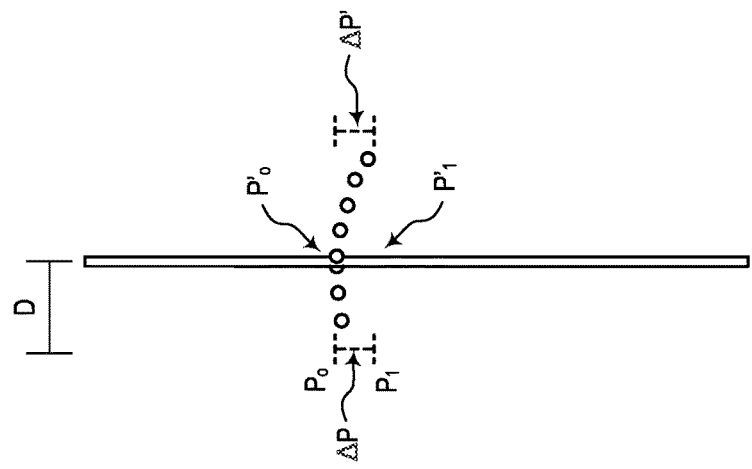
FIGS. 9A and 9B illustrate an example of a tapping input gesture being performed on a virtual object.
Figure 9A:
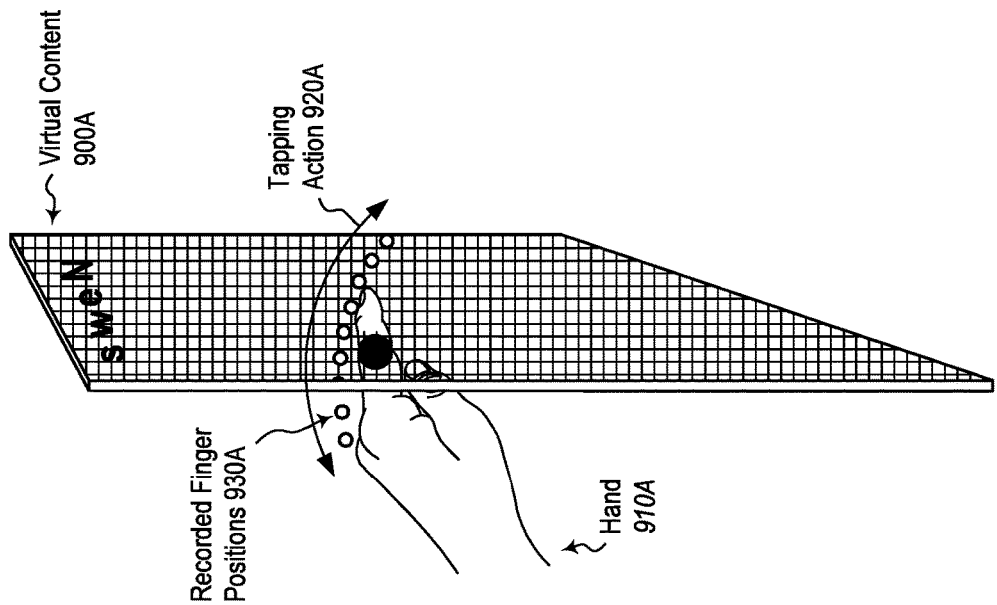

FIGS. 9A and 9B illustrate another 3D to 2D translation process. Specifically, FIGS. 9A and 9B present a phenomenon that occurs when conducting a tapping input gesture in an augmented-reality scene.

As illustrated, FIG. 9A presents virtual content 900A and a user's hand 910A performing a tapping action 920A on that virtual content 900A. Because there is no definitive backstop for the virtual content 900A, a portion of the user's hand 910A may actually pass through the virtual content 900A during the tapping action 920A. FIG. 9A also shows some of the user's recorded hand positions. These positions are collectively illustrated as recorded finger positions 930A.

FIG. 9B represents the same scene as FIG. 9A but from a slightly different perspective and with similar point information as that which was described in FIG. 8B. To clarify, points $P_o$ and $P_1$ are composite values (e.g., highest/lowest and most-left) of the recorded finger positions 930A, and points $P'_o$ and $P'_1$ are translated values of the user's 3D tapping action 920A onto a 2D coordinate system in relation to the virtual content 900A. Measurement D is the distance between $P_o$ and the virtual content 900A. Measurement $\Delta P$ is the distance between $P_o$ and $P_1$, and measurement $\Delta P'$ is the distance between translated points $P'_o$ and $P'_1$.

To compensate for a 3D tapping action, embodiments employ a "dead zone." To clarify, if the translated 2D touch points (i.e. $P'_o$ and $P'_1$) are outside of this dead zone after a user touches down (i.e. performs the 3D tapping action), then the virtual content will not be triggered and the tap will be ignored. This process ensures that the virtual content (e.g., a virtual button, virtual hyperlink, etc.) will get pressed only when the user taps in an acceptable manner (e.g., by not moving her finger outside of the "dead zone").

As illustrated in FIGS. 9A and 9B, when a user performs the tapping action 920A on the virtual content 900A, the user's tapping finger usually moves in an arc-like manner. To compensate for this arc phenomenon, the embodiments adjust the amount of the translated 2D point movement (i.e. ΔP' in FIG. 9B) by dividing the change in actual finger movement ΔP by the distance from the finger to the screen (i.e. distance D). This relationship is shown in the following manner:

$$\Delta P' \propto \frac{\Delta P}{D}$$

Similar to the previous relationship, this relationship was developed heuristically, but the function can also be learned via machine learning (e.g., regression modeling or neural networks).

Therefore, the present embodiments are able to translate a user's 3D input gesture onto a 2D coordinate system in an augmented-reality scene. Further, the embodiments (as discussed above) may apply additional conversions to further enhance this 3D to 2D translation. By translating this data, a user can readily enter input at a virtual object in the augmented-reality scene. Similar to the above disclosure, however, the present embodiments are not limited solely to these compensatory techniques. Indeed, other embodiments are available for enhancing and compensating for a 3D translation onto a 2D coordinate plane. For example, other embodiments compensate for this 3D translation by factoring in a user's hand pose or even by expanding/shrinking the dead zone. Accordingly, the present embodiments are able to support a wide variety of enhancing/compensatory techniques for translating a 3D movement onto a 2D coordinate plane.

Accordingly, the preceding discussion may be summarized as follows. First, a 3D movement of a part of the user's actual hand is monitored. This 3D movement is in relation to a 2D interactive virtual object. Second, the 3D movement of the user's hand is translated into a 2D movement relative to a coordinate system of the 2D interactive virtual object. Last, the translated 2D movement is provided as input to an executing application. As a result, the embodiments are able to translate 3D motion onto a 2D coordinate while also introducing compensations to further enhance the 3D to 2D translation.

Figure 10:
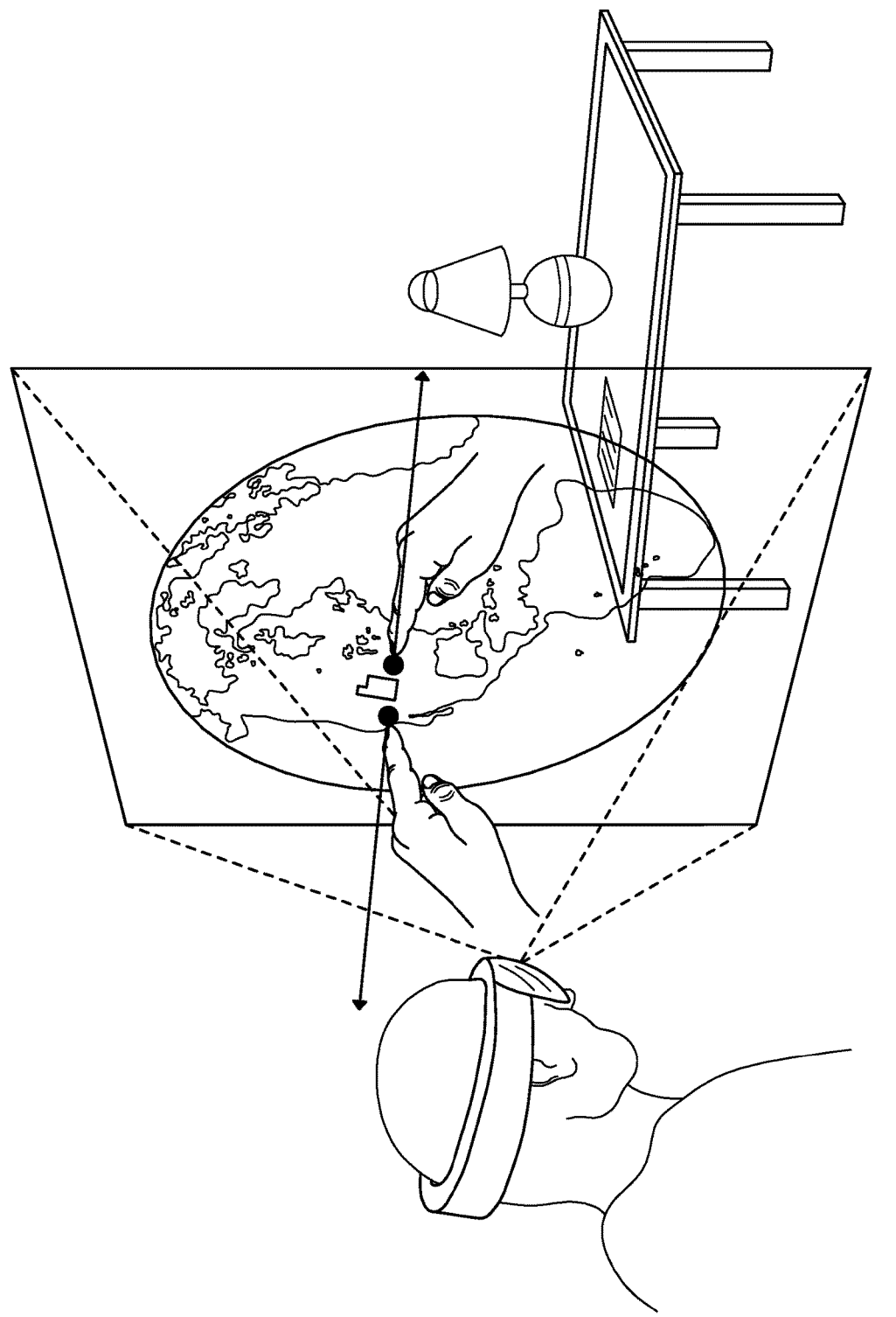
FIG. 10 illustrates an example scenario in which a multi-touch input is being entered on a virtual object.

Attention will now be directed to FIG. 10 which illustrates an example scenario where a user is entering input at virtual content via a multi-touch gesture. In particular, FIG. 10 shows that a user is using both hands to manipulate virtual content (e.g., the globe). In this scenario, the user is performing a multi-touch zooming action to zoom in on a desired location on the globe. As illustrated, two of the user's fingers are within the input threshold distance to the globe. To demonstrate this status, two of the input visual cues (i.e. the black dots) are projected underneath the user's two fingers at the points where the user's input will be entered. As the user moves her fingers in the directions of the arrows, a zooming input will be entered and a zooming action will be conducted on the globe.

Figure 11:
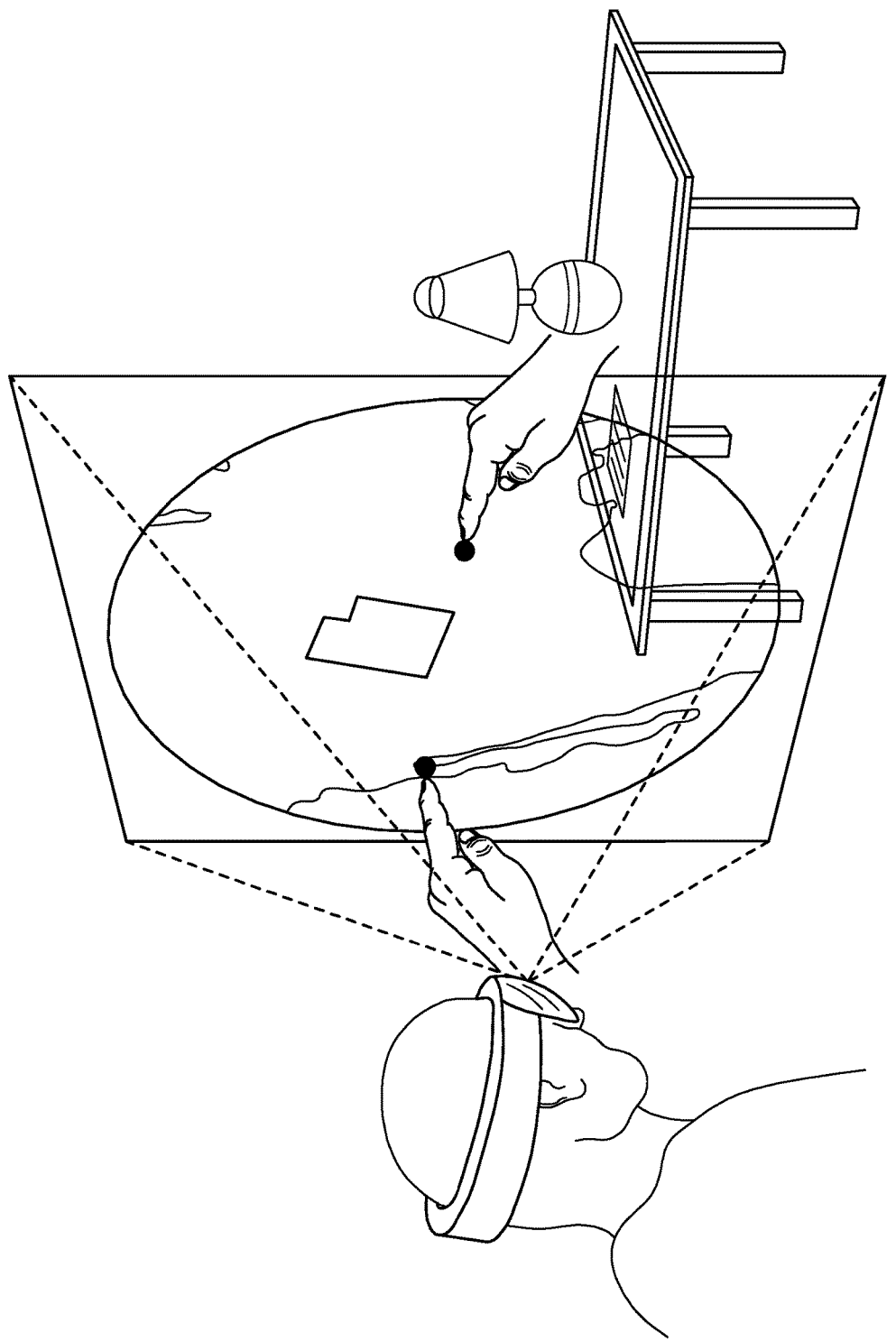
FIG. 11 illustrates another example scenario in which a multi-touch input is being entered on a virtual object.

This zooming action is shown in FIG. 11. To clarify, FIG. 11 shows the results of the user's multi-touch zooming action. Whereas a large portion of the globe was previously visible in FIG. 10, FIG. 11 shows a much smaller, zoomed-in area of the globe. Accordingly, in addition to single touch inputs, the present embodiments are also able to receive multi-touch inputs. Even further, the present embodiments are able to project visual cues for each touch input where the user is attempting to enter her input on the virtual object.

Figure 12:
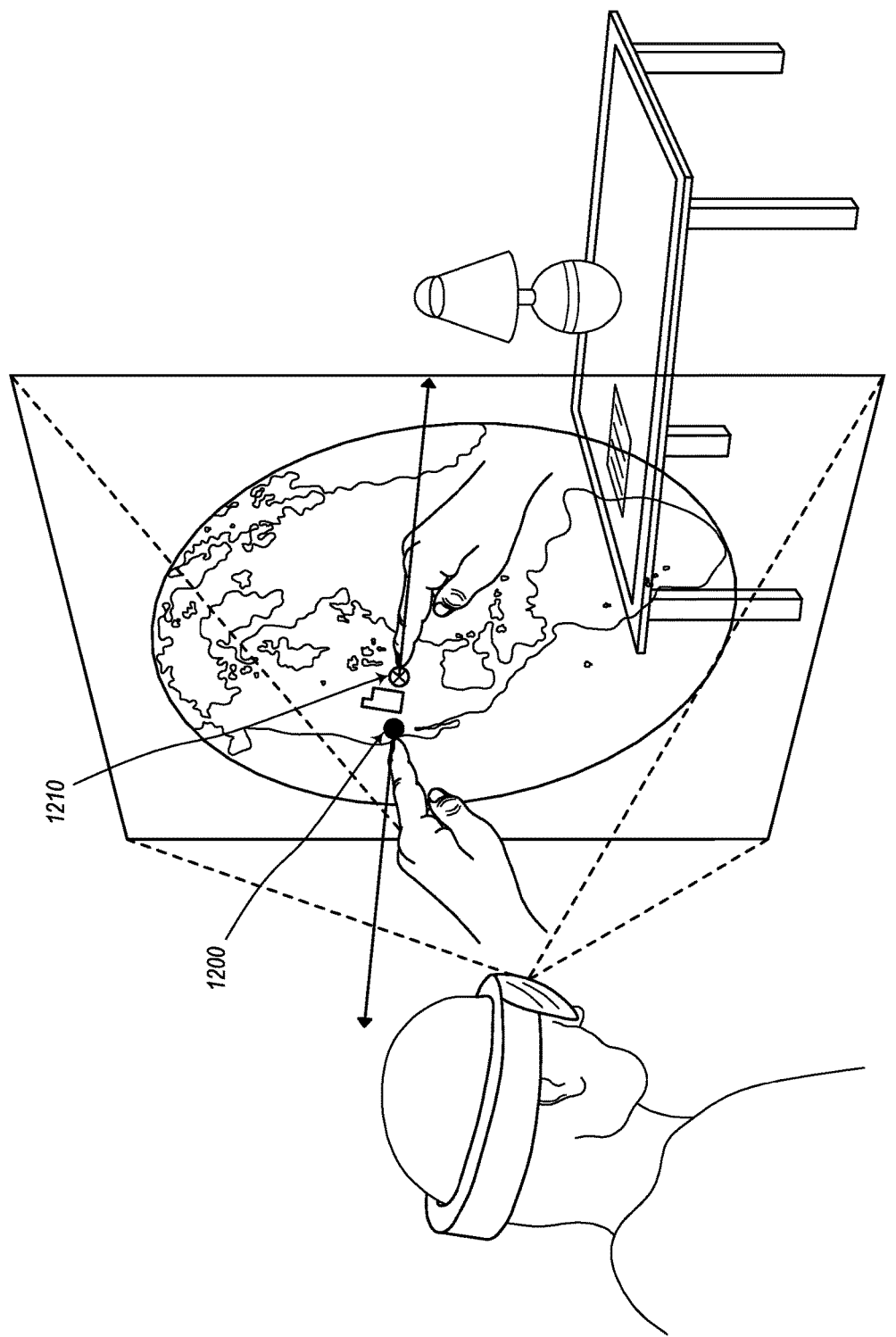
FIG. 12 demonstrates additional functionality related to a multi-touch input.

Whereas FIGS. 10 and 11 illustrated a scenario in which both of the user's fingers were within the input threshold distance to the virtual content, FIG. 12 illustrates a scenario in which one touch input (e.g., a finger on the user's left hand) is within the input threshold distance while a different touch input (e.g., a finger on the user's right hand) is within only the target threshold distance. To clarify, in the scenario presented in FIG. 12, only the finger on the user's left hand is sufficiently proximate to the virtual content so as to be within the input threshold distance. Because this finger is within the input threshold distance, the input visual cue (depicted as cue 1200) is rendered underneath that finger.

In contrast, one finger on the user's right hand is located only within the target threshold distance to the virtual content. As a result of being located only within the target threshold distance, the target visual cue (depicted as cue 1210) is rendered underneath that finger. Therefore, according to the principles discussed herein, because the user is attempting to enter a multi-touch input and because one finger is not within the input threshold distance, when the user attempts to perform the zooming action (illustrated by the two approximately horizontal arrows near the cues 1200 and 1210), no input will be received. To clarify, unless the user moves her right hand so that her finger is within the input threshold distance, the user will not be able to complete her desired action. Once the user does move the appropriate distance to bring her finger within the input threshold distance, then the user may commence with entering her desired multi-touch input.

Figure 13:
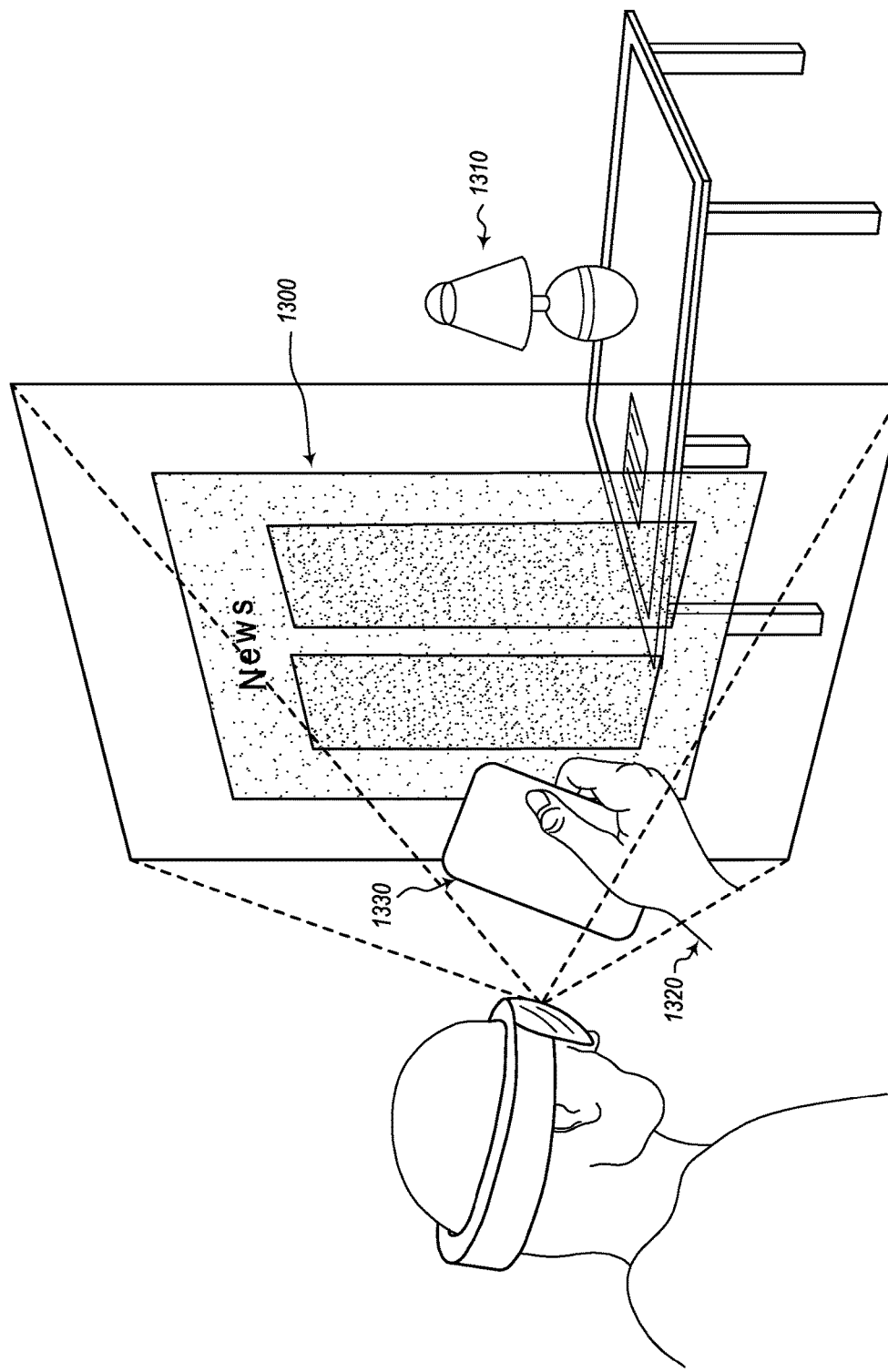
FIG. 13 illustrates a scenario in which multiple virtual objects are being projected simultaneously.

FIG. 13 shows additional functionality of the present embodiments. In particular, FIG. 13 shows a scenario in which a HMD is rendering an augmented-reality scene. Here, the scene includes a first virtual object 1300 (i.e. the news feed) rendered in an environment that includes actual real-world objects 1310 (e.g., a real-world lamp and table). FIG. 13 also shows that the user's actual hand 1320 is holding a second virtual object 1330 (e.g., the virtual tablet). To clarify, hand 1320 is the user's actual hand, not a virtualization of the user's hand. Also, the second virtual object 1330 (i.e. the virtual tablet) is virtual content; it is not an actual tablet. Accordingly, FIG. 13 shows that the user is holding the second virtual object 1330 (i.e. the virtual tablet) in her actual hand 1320 and that this second virtual object 1330 is located between the user's head and the first virtual object 1300. From this example, it will be appreciated that the embodiments are able to provide virtual depth and perspective, even between different virtual objects.

Continuing with this example, in some instances, part of the user's hand may be simultaneously positioned within (1) either the target threshold distance or the input threshold distance to the first virtual object 1300 and (2) either the target threshold distance or the input threshold distance to the second virtual object 1330. When such a situation occurs, the embodiments are able to determine which interactive virtual object the user is attempting to interact with by performing one or more different actions.

For example, the embodiments are able to determine which virtual content the user is attempting to interact with by one or more of (1) tracking an eye movement of the user, (2) tracking a vocal cue of the user, and/or 3) tracking one or more events occurring within the augmented-reality scenario (e.g., perhaps the user is playing a game/application, and the application determines that the user's attention should be redirected to a particular location, as a result, the application projects highly salient content or renders existing content in a more salient manner so as to capture the user's attention). In response to determining that the user is attempting to interact with one of either the first virtual object or the second virtual object, the embodiments then display either the target visual cue or the input visual cue on the appropriate visual object.

Exemplary Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. These methods are implemented by one or more processors of a computer system (e.g., the computer system 200 of FIG. 2). By way of example, a computer system includes one or more computer-readable hardware storage media that store computer-executable code. This computer-executable code is executable by the one or more processors to cause the computer system to perform these methods.

FIG. 14 illustrates an exemplary method 1400 for facilitating the manner in which a user interacts with virtual content in an augmented-reality scene.

In particular, method 1400 includes an act where an augmented-reality scene is rendered on a wearable display of the computer system for a user who is wearing the wearable display (act 1410). This may be performed by the scene component 210 of the computer system 200 illustrated in FIG. 2.

Method 1400 also includes an act in which an interactive virtual object of an application is rendered within the augmented-reality scene (act 1420). To clarify, the application may include a plethora of content, some of which is rendered in the augmented-reality scene. The interactive virtual object is included among the application's other rendered content. As a result, the augmented-reality scene may simultaneously render one or more different interactive virtual objects. This may be performed by the application component 220 of the computer system 200.

Method 1400 then includes an act in which a position of a part of an actual hand of the user is detected (act 1430). This position is detected relative to a portion of the interactive virtual object. By way of example, the part of the user's actual hand may be one or more of the user's actual fingers. Further, the portion of the interactive virtual object may be the entire interactive virtual object (e.g., a selectable button or other type of user object) or simply a sub-part of the interactive virtual object (e.g., a hyperlink included within a news feed article). This may be performed by the scene component 210 of the computer system 200.

Method 1400 then includes an act where, in response to determining that the part of the user's actual hand is within a target threshold distance to the portion of the interactive virtual object, a target visual cue is displayed on the portion of the interactive virtual object (act 1440). To clarify, the target visual cue is not displayed on the user's finger; rather, the target visual cue is displayed underneath the user's finger on the interactive virtual object. This target visual cue is displayed at an anticipated ending location on the interactive virtual object where the part of the user's actual hand is anticipated to be moving towards. This may be performed by the threshold detection component 230 of the computer system 200.

Subsequently, method 1400 includes an act where, in response to determining that the part of the user's actual hand is within an input threshold distance to the portion of the interactive virtual object, an input visual cue is now displayed on the portion of the interactive virtual object (act 1450). To clarify, the embodiments are able to track the movement of the user's hand. As the user moves her hand closer to the interactive virtual object, the user's hand will satisfy certain threshold distance requirements. At first, the user may bring her hand sufficiently close to be within the target threshold distance. Then, as the user continues to move her hand closer to the interactive virtual object, she will eventually reach the input threshold distance. When the input threshold distance is satisfied, then the input visual cue will be projected in the scene. This input visual cue indicates that input is now receivable/enterable for the interactive virtual object. Further, this input is receivable/enterable at a same location as where the input visual cue is being displayed. As a result, when the user's hand is within the input threshold distance, then the user may enter input. In contrast, when the user's hand is located only within the target threshold distance, then input will not be received and only the target visual cue will be rendered in the scene. This target visual cue is beneficial because it provides an indication to the user as to where the computer system anticipates that the user wants to eventually enter input. Act 1450 may be performed by the threshold detection component 230 of computer system 200.

As discussed previously, some embodiments will displace the target visual cue with the input visual cue as soon as the part of the user's actual hand is within the input threshold distance. In contrast, other embodiments will cause the target visual cue to progressively change in appearance until the input visual cue is displayed. This progressive change mimics a movement of the user's actual hand as the hand progressively moves from the target threshold distance to the input threshold distance.

Method 1400 is then shown as including act 1460 where, based on a subsequent movement of the part of the user's actual hand while the part of the user's actual hand is within the input threshold distance, input is provided to the application via the interactive virtual object. This input may include a scroll input gesture, a zoom input gesture, a tap input gesture, a swipe input gesture, a multiple touch input gesture that incorporates one or more of those other gestures, and/or any other type of input gesture. This input may also include any other kind of touch input conventionally known. The input may also be provided in response to or to coincide with the display of the input visual cue, even without receiving further movement from the user. The input may also be provided, in some instances, in response to conditions existing for the input visual cue to be continuously displayed for a predetermined duration of time (e.g., for 0.25 seconds, 0.5 seconds, 1 second, 1+ seconds, less than 1 second etc.). For instance, when the user's finger is positioned within the input cue threshold distance of a virtual interactive element for a predetermined continuous duration of time, that alone may be enough to trigger a selection input of that interactive element. The input entry is performed by the input component 240 of the computer system 200.

In some instances, the part of the user's actual hand may actually pass through the interactive virtual object in the augmented-reality scene. Further, the part of the user's hand may pass so far through that the part has surpassed either the input threshold distance or the target threshold distance (in relation to the backside of the virtual object). Accordingly, in response to determining that the part of the user's actual hand exceeds the input threshold distance in relation to a backside of the portion of the interactive object (as is generally shown in FIG. 7D), then the embodiments will stop providing input to the application via the interactive virtual object.

Attention will now be directed to FIG. 15. In particular, FIG. 15 illustrates an exemplary method 1500 for translating a 3D movement onto a 2D coordinate plane in an augmented-reality scene.

Initially, method 1500 includes an act of rendering an augmented-reality scene (act 1510). This scene includes a virtual interface for receiving input. Here, this act is performed by the scene component 210 of system 200.

Next, the system detects a position of a part of a user's actual hand (act 1520). This position is detected relative to a portion of the virtual interface and, even more particularly (in some embodiments) relative to a particular virtual interactive object. This act may be performed by the scene component 210 of computer system 200.

Next, a 3D movement of the part of the user's actual hand is monitored (act 1530). This 3D movement is performed within an input threshold distance to the virtual interface. Here, the threshold detection component 230 of computer system 200 determines whether the movement is performed within the input threshold distance while the scene component 210 monitors the 3D movement. If so, the 3D movement is continuously translated into a 2D movement relative to the virtual interface (act 1540). This may be accomplished by application component 220.

This disclosed embodiment also includes providing the translated 2D movement as input for the virtual interface (act 1550). The input component 240 of computer system 200 performs this act.

Lastly, method 1500 includes act 1560 in which content on the virtual interface is manipulated in response to the received input. The input component 240 also performs this act.

Accordingly, the disclosed embodiments are directed to systems, hardware storage devices, and methods for facilitating the manner in which a user interacts with virtual content included within an augmented-reality scene. Also, some embodiments facilitate the manner in which a 3D movement is translated onto a 2D coordinate plane that is used within an augmented-reality scene.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processor(s); and
one or more computer-readable hardware storage media having stored thereon computer-executable instructions that are executable by the one or more processor(s) to cause the computer system to:
on a wearable display of the computer system, render an augmented-reality scene for a user who is wearing the wearable display;
within the augmented-reality scene, render an interactive virtual object;
detect a position of a part of an actual hand of the user, the position being detected relative to a portion of the interactive virtual object such that the part of the user's actual hand is identified as approaching the portion of the interactive virtual object;
anticipate a type of gesture the user will subsequently use to interact with the interactive virtual object, wherein the anticipated gesture type is anticipated based at least partially on an identified type of the interactive virtual object, where the identified type is based on which interactive abilities the interactive virtual object is identified as having;
in response to determining that the part of the user's actual hand is within a target threshold distance to the portion of the interactive virtual object, display a target visual cue on the portion of the interactive virtual object;
in response to determining that the part of the user's actual hand is within an input threshold distance to the portion of the interactive virtual object, display an input visual cue on the portion of the interactive virtual object, the input visual cue indicating that input is now receivable for the interactive virtual object, the input being received at a same location as where the input visual cue is being displayed; and
upon a condition in which the part of the user's actual hand is simultaneously positioned within (i) either the target threshold distance or the input threshold distance to the portion of the interactive virtual object and (ii) either a corresponding target threshold distance or a corresponding input threshold distance to a corresponding different portion of a different interactive virtual object:
determine which interactive virtual object the user is attempting to interact with;
in response to determining that the user is attempting to interact with the corresponding different portion of the different interactive virtual object, display either the corresponding target visual cue or the corresponding input visual cue on the corresponding different portion of the different interactive virtual object; and
based on a subsequent movement of the part of the user's actual hand while the part of the user's actual hand is within the corresponding input threshold distance, provide input to an application via the different interactive virtual object.

2. The computer system of claim 1, wherein the target visual cue is displayed at an anticipated ending location on the interactive virtual object where the part of the user's actual hand is anticipated to be moving towards.

3. The computer system of claim 1, wherein the input visual cue displaces the target visual cue as soon as the part of the user's actual hand is within the input threshold distance.

4. The computer system of claim 1, wherein, as the part of the user's actual hand progressively moves from the target threshold distance to the input threshold distance, the target visual cue progressively changes in appearance until the input visual cue is displayed.

5. The computer system of claim 1, wherein the part of the user's actual hand is an actual finger of the user's actual hand.

6. The computer system of claim 1, wherein execution of the computer-executable instructions further causes the computer system to:

detect that the part of the user's actual hand has passed through the interactive virtual object in the augmented-reality scene; and in response to determining that the part of the user's actual hand exceeds the input threshold distance in relation to a back side of the portion of the interactive virtual object, stop providing input to the application via the interactive virtual object.

7. The computer system of claim 1, wherein providing the input to the application via the interactive virtual object includes a scroll input gesture.

8. The computer system of claim 1, wherein providing the input to the application via the interactive virtual object includes a zoom input gesture.

9. The computer system of claim 1, wherein providing the input to the application via the interactive virtual object includes a tap input gesture.

10. The computer system of claim 1, wherein providing the input to the application via the interactive virtual object includes a multiple touch input gesture.

11. A method implemented by one or more processor(s) of a computer system, the method comprising:
    on a wearable display of the computer system, rendering an augmented-reality scene for a user who is wearing the wearable display;
    within the augmented-reality scene, rendering an interactive virtual object;
    detecting a position of a part of an actual hand of the user, the position being detected relative to a portion of the interactive virtual object such that the part of the user's actual hand is identified as approaching the portion of the interactive virtual object;
    anticipate a type of gesture the user will subsequently use to interact with the interactive virtual object, wherein the anticipated gesture type is anticipated based at least partially on an identified type of the interactive virtual object, where the identified type is based on which interactive abilities the interactive virtual object is identified as having;
    in response to determining that the part of the user's actual hand is within a target threshold distance to the portion of the interactive virtual object, displaying a target visual cue on the portion of the interactive virtual object;
    in response to determining that the part of the user's actual hand is within an input threshold distance to the portion of the interactive virtual object, displaying an input visual cue on the portion of the interactive virtual object, the input visual cue indicating that input is now receivable for the interactive virtual object, the input being received at a same location as where the input visual cue is being displayed; and
    upon a condition in which the part of the user's actual hand is simultaneously positioned within (i) either the target threshold distance or the input threshold distance to the portion of the interactive virtual object and (ii) either a corresponding target threshold distance or a corresponding input threshold distance to a corresponding different portion of a different interactive virtual object:
        determine which interactive virtual object the user is attempting to interact with;
        in response to determining that the user is attempting to interact with the corresponding different portion of the different interactive virtual object, display either the corresponding target visual cue or the corresponding input visual cue on the corresponding different portion of the different interactive virtual object; and
        based on a subsequent movement of the part of the user's actual hand while the part of the user's actual hand is within the corresponding input threshold distance, providing input to an application via the different interactive virtual object.

12. The method of claim 11, wherein the target threshold distance and the input threshold distance are dynamically adjustable based on a size of the interactive virtual object within the augmented-reality scene.

13. The method of claim 11, wherein determining which interactive virtual object the user is attempting to interact with is performed at least in part by one or more of (i) tracking an eye movement, (ii) tracking a vocal cue, or (iii) tracking one or more events occurring within the augmented-reality scene.

14. The method of claim 11, wherein the target threshold distance is about 10 centimeters.

15. The method of claim 11, wherein the interactive virtual object is a two-dimensional object, and wherein providing input to the application via the interactive object includes:
    monitoring a three-dimensional movement of the part of the user's actual hand;
    translating the three-dimensional movement into a two-dimensional movement relative to the two-dimensional interactive object; and
    providing the two-dimensional movement as the input to the application.

16. One or more hardware storage devices having stored thereon computer-executable instructions that are executable by one or more processor(s) of a computer system to cause the computer system to:
    on a wearable display of the computer system, render an augmented-reality scene for a user who is wearing the wearable display;
    within the augmented-reality scene, render an interactive virtual object;
    detect a position of a part of an actual hand of the user, the position being detected relative to a portion of the interactive virtual object such that the part of the user's actual hand is identified as approaching the portion of the interactive virtual object;
    anticipate a type of gesture the user will subsequently use to interact with the interactive virtual object, wherein the anticipated gesture type is anticipated based at least partially on an identified type of the interactive virtual object, where the identified type is based on which interactive abilities the interactive virtual object is identified as having;
    in response to determining that the part of the user's actual hand is within a target threshold distance to the portion of the interactive virtual object, display a target visual cue on the portion of the interactive virtual object;
    in response to determining that the part of the user's actual hand is within an input threshold distance to the portion of the interactive virtual object, display an input visual cue on the portion of the interactive virtual object, the input visual cue indicating that input is now receivable for the interactive virtual object, the input being received at a same location as where the input visual cue is being displayed; and
    upon a condition in which the part of the user's actual hand is simultaneously positioned within (i) either the target threshold distance or the input threshold distance to the portion of the interactive virtual object and (ii) either a corresponding target threshold distance or a corresponding input threshold distance to a corresponding different portion of a different interactive virtual object:

determine which interactive virtual object the user is attempting to interact with;

in response to determining that the user is attempting to interact with the corresponding different portion of the different interactive virtual object, display either the corresponding target visual cue or the corresponding input visual cue on the corresponding different portion of the different interactive virtual object; and based on a subsequent movement of the part of the user's actual hand while the part of the user's actual hand is within the corresponding input threshold distance, provide input to an application via the different interactive virtual object.

17. The one or more hardware storage devices of claim 16, wherein the interactive virtual object is rendered as a part of a two-dimensional planar surface within the augmented-reality scene.

18. The one or more hardware storage devices of claim 16, wherein the interactive virtual object is rendered as part of a simulated three-dimensional object within the augmented-reality scene.

19. The one or more hardware storage devices of claim 16, wherein an audio cue is played when either the target visual cue or the input visual cue is displayed.

20. A computer system comprising:

one or more processors; and one or more computer-readable hardware storage media having stored thereon computer-executable instructions, the computer-executable instructions being executable by the one or more processors to cause the computer system to:

on a wearable display of the computer system, render an augmented-reality scene for a user who is wearing the wearable display;

within the augmented-reality scene, render an interactive virtual object;

detect a position of a part of an actual hand of the user, the position being detected relative to a portion of the interactive virtual object;

in response to determining that the part of the user's actual hand is within a target threshold distance to the portion of the interactive virtual object, display a target visual cue on the portion of the interactive virtual object;

in response to determining that the part of the user's actual hand is within an input threshold distance to the portion of the interactive virtual object, display an input visual cue on the portion of the interactive virtual object, the input visual cue indicating that input is now receivable for the interactive virtual object, the input being received at a same location as where the input visual cue is being displayed, wherein the part of the user's actual hand is simultaneously positioned within (i) either the target threshold distance or the input threshold distance to the portion of the interactive virtual object and (ii) either the target threshold distance or the input threshold distance to a different portion of a different interactive virtual object;

determine which interactive virtual object the user is attempting to interact with;

in response to determining that the user is attempting to interact with the different portion of the different interactive virtual object, display either the target visual cue or the input visual cue on the different portion of the different interactive virtual object; and based on a subsequent movement of the part of the user's actual hand while the part of the user's actual hand is within the input threshold distance, provide input to an application via the interactive virtual object.

* * * * *